(12) United States Patent
Parry

(10) Patent No.: US 10,742,688 B2
(45) Date of Patent: *Aug. 11, 2020

(54) PLATFORM FOR AUTOMATED REGULATORY COMPLIANCE MONITORING OF MESSAGING SERVICES

(71) Applicant: DeepView Solutions, London (GB)

(72) Inventor: Catherine Jessie Walker Parry, London (GB)

(73) Assignee: DEEPVIEW SOLUTIONS, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/355,239

(22) Filed: Mar. 15, 2019

(65) Prior Publication Data

US 2019/0268377 A1    Aug. 29, 2019

Related U.S. Application Data

(63) Continuation-in-part of application No. 15/845,478, filed on Dec. 18, 2017, now abandoned.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 30/06* | (2012.01) |
| *G06Q 10/08* | (2012.01) |
| *H04L 29/06* | (2006.01) |
| *H04L 29/08* | (2006.01) |
| *H04L 12/58* | (2006.01) |
| *G06F 40/30* | (2020.01) |

(52) U.S. Cl.
CPC .............. *H04L 63/20* (2013.01); *G06F 40/30* (2020.01); *H04L 51/046* (2013.01); *H04L 51/32* (2013.01); *H04L 63/0442* (2013.01); *H04L 63/1408* (2013.01); *H04L 67/22* (2013.01); *H04L 67/26* (2013.01); *H04L 67/306* (2013.01)

(58) Field of Classification Search
CPC ...... G06Q 50/01; G06Q 10/105; H04L 63/20; H04L 63/0442; H04L 63/1408; H04L 67/22; H04L 67/306; H04L 67/26; H04L 51/32; H04L 51/046; G06F 40/30
USPC .................................. 705/1.1–912, 319, 320
See application file for complete search history.

(56) References Cited

U.S. PATENT DOCUMENTS

| | | | |
|---|---|---|---|
| 8,972,511 B2 | 3/2015 | Freire et al. | |
| 9,369,433 B1 | 6/2016 | Paul et al. | |
| 9,652,597 B2 * | 5/2017 | Roundy | ................... G06F 21/10 |
| 9,813,419 B2 * | 11/2017 | Steinberg | ................. H04L 63/10 |
| 9,923,931 B1 * | 3/2018 | Wagster | ................... H04L 63/30 |

(Continued)

*Primary Examiner* — Jonathan P Ouellette
(74) *Attorney, Agent, or Firm* — Brian R. Galvin; Brian S. Boon; Galvin Patent Law LLC

(57) ABSTRACT

A system for automated regulatory compliance monitoring of messaging services is provided, comprising a compliance data service configured to: provide an interface for an administrative user to define a compliance rule, store the compliance rule in a database; a messaging collection service configured to: monitor at least one messaging service associated with a monitored user; a compliance monitoring engine configured to: retrieve the collected data, retrieve the compliance rule from the compliance database, and process and analyze the monitored messages to determine whether they contain non-compliant data.

20 Claims, 21 Drawing Sheets

(56) References Cited

U.S. PATENT DOCUMENTS

| | | | |
|---|---|---|---|
| 2007/0230486 A1* | 10/2007 | Zafirov | H04L 43/12 370/401 |
| 2011/0209196 A1* | 8/2011 | Kennedy | G06F 21/121 726/1 |
| 2014/0229376 A1 | 8/2014 | Kaminsky et al. | |
| 2016/0132816 A1* | 5/2016 | Lush | G06Q 10/063112 705/7.14 |

* cited by examiner

PLATFORM FOR AUTOMATED REGULATORY COMPLIANCE MONITORING OF MESSAGING SERVICES

CROSS-REFERENCE TO RELATED APPLICATIONS

This application is a continuation-in-part of U.S. patent application Ser. No. 15/845,478 titled "PLATFORM FOR AUTOMATED SOCIAL MEDIA REGULATORY COMPLIANCE MONITORING", filed on Dec. 18, 2017, the entire specification of which is incorporated herein by reference.

BACKGROUND OF THE INVENTION

Field of the Invention

The disclosure relates to the field of communications and messaging monitoring, particular for the purposes of adhering to established compliance rules.

Discussion of the State of the Art

The rise in popularity of portable devices, and the increasing culture of sharing various aspects of one's life on social media and messaging has proven to be an evolving burden on regulating compliance by employees in the workplace. For example, employees of various companies are constantly found to be unintentionally including sensitive information in plain view when posting about mundane things on their public feeds, causing companies to pay hefty fines. The problem may only be getting worse. According to current trends, the number of connected devices per person continues to increase, and may reach 37 billion connected devices by the year 2020.

There is currently a lack of tools to monitor and control what users, who may responsible for sensitive information, post on their social media profiles or communicate through messaging services. What is needed to a system that monitors user social media profiles, and communications channels to ensure compliancy is maintained, utilizing technologies such as message collector services.

SUMMARY OF THE INVENTION

Accordingly, the inventor has conceived, and reduced to practice, a platform for automated regulatory compliance monitoring of messaging services.

According to a preferred embodiment, a system is disclosed, comprising: a compliance computer comprising a memory, at least one processor, and a plurality of programming instructions stored in the memory, the plurality of programming instructions when executed by the processor, cause the processor to: receive at least one compliance rule from an administrative user device; receive, from a monitored user device, a plurality of credentials, the credentials used to access a plurality of data from at least one messaging service account associated to the monitored user device; generate an asymmetric encryption key for the monitored user device to ensure security of the plurality of data; retrieve a list of user profiles associated with the monitored user device, each user profile of the list corresponding to at least one conversation with the monitored user device; receive from the monitored device at least one user profile, of the list of user profiles, to monitor for compliance; periodically retrieve a plurality of conversation data from the at least one messaging service to monitor for compliance, the plurality of conversation data associated to the at least one user profile; analyze the plurality of conversation data with the at least one compliance rule to determine if the message contains non-compliant content; determine a severity of the non-compliance based on a pre-determined level of severity, the level defined by the administrative user device; and notify the administrative user device if non-compliant content is discovered that is of a severity at or above the pre-determined level.

In another preferred embodiment, a method for automated message service monitoring is provided, comprising the steps of: receiving at least one compliance rule from an administrative user device; receiving, from a monitored user device, a plurality of credentials, the credentials used to access a plurality of data from at least one messaging service account associated to the monitored user device; generating an asymmetric encryption key for the monitored user device to ensure security of the plurality of data; retrieving a list of user profiles associated to the monitored user device, each user profile of the list corresponding to a conversation with the monitored user device; receiving from the monitored device at least one user profile, of the list of user profiles, to monitor for compliance; periodically retrieving a plurality of conversation data from the at least one messaging service to monitor for compliance, the plurality of conversation data associated to the at least one user profile; analyzing the plurality of conversation data with the at least one compliance rule to determine if the message contains non-compliant content; determining a severity of the non-compliance based on a pre-determined level of severity, the level defined by the administrative user device; and notifying the administrative user device if non-compliant content is discovered that is of a severity at or above the pre-determined level.

Multiple aspects of an embodiment for automated message service monitoring are provided, including the system of claim wherein if there is non-compliant content, the plurality of programming instructions when executed by the processor, further cause the processor to send a notification to the monitored user device of the non-compliant content to take corrective action; the system wherein the analysis of the plurality of conversations is selected from the group consisting of image analysis, natural language analysis, metadata analysis, and speech analysis based on automatic speech recognition; the system wherein a record of compliance associated to the monitored user device is stored; the system wherein the plurality of programming instructions when executed by the processor, further cause the processor to continuously monitor the at least one messaging service account for suspicious activity, the suspicious activity associated to identify theft and cyberattacks; the system wherein the plurality of programming instructions when executed by the processor, further cause the processor to send compliance training and testing to a plurality of user devices; the system wherein the plurality of programming instructions when executed by the processor, further cause the processor to send compliance training and testing to the monitored user device based on the record of compliance; the system wherein non-compliant content is determined from processing the plurality of conversation data in context; the system wherein the context is a geotag associated to at least one conversation data of the plurality of conversation data; the system wherein the plurality of programming instructions when executed by the processor, further cause the processor to determine non-compliant content from one or more samples received from one or more user devices of the plurality of user devices; the method further comprising the step of sending a notification to the monitored user device of the non-compliant content to take corrective action; the method wherein an analysis of the plurality of conversations is selected from the group consisting of image analysis, natural language analysis, metadata analysis, and speech analysis based on automatic speech recognition; the method further comprising the step of storing a record of compliance associated to the monitored user device; the method further comprising the step of continuously monitoring the at least one messaging service account for suspicious activity, the suspicious activity associated to identify theft and cyberattacks; the method further comprising the step of sending compliance training and testing to a plurality of user devices; the method further comprising the step of sending compliance training and testing to the monitored user device based on the record of compliance; the method further comprising the step of determining non-compliant content by processing the plurality of conversation data in context; the method wherein the context is a geotag associated to at least one conversation data of the plurality of conversation data; and the method further comprising the step of determining non-compliant content from one or more samples received from one or more user devices of the plurality of user devices.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
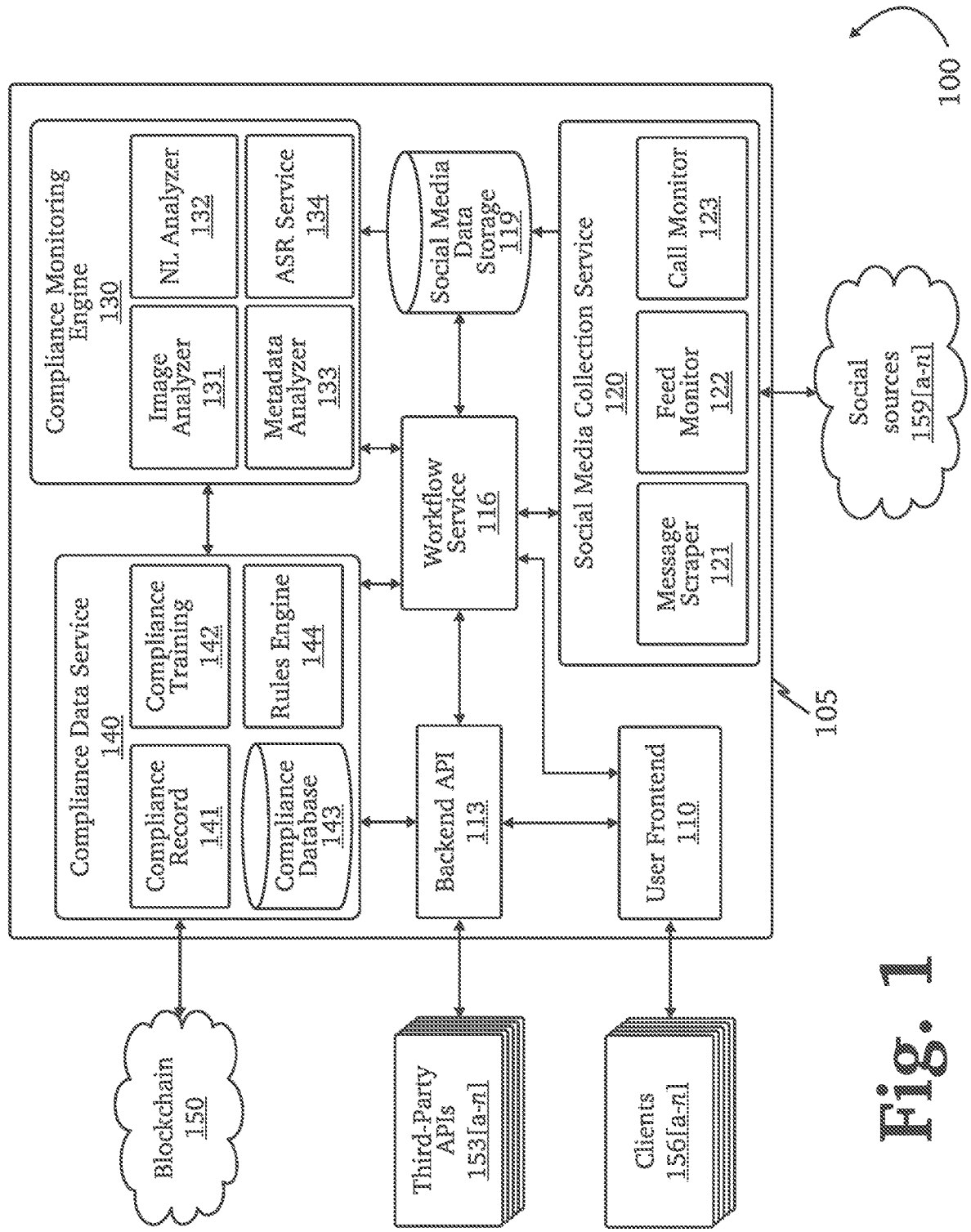
FIG. 1 is an illustration of an exemplary system architecture for a system for a platform for automated social media monitoring according to various embodiments of the invention.

The inventor has conceived, and reduced to practice, a platform for automated regulatory compliance monitoring of messaging services.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

In an aspect of an embodiment, after determining the collected data contains non-compliant content the system notifies the monitored user of the non-compliant content to take corrective action.

In an aspect of an embodiment, the plurality of web sources is continuously monitored for suspicious activity for the purposes of preventing identify theft, and cyberattacks.

In an aspect of an embodiment, compliance training and testing is periodically administered to a plurality of users.

In an aspect of an embodiment, non-compliant content is determined from processing a plurality of datasets in context.

In an aspect of an embodiment, user-provided samples are also used by the compliance monitoring engine in determining non-compliant content.

Definitions

The term "administrative user" as used herein means the user profile of any person or entity that arranges for monitoring of a monitored user. In one embodiment, the administrative user may be a compliance officer of a company wishing to monitor its employees for regulatory compliance.

The term "conversation" as used herein means at least one message sent through a messaging service between at least two persons. Typically, a conversation will comprise a series of messages back and forth between at least two persons The terms "credential" or "credentialing system" as used herein mean the use of some form of digital identification to ensure that the person using the system is authorized to use the system. In one embodiment, the credentialing system comprises a QR code displayed to an employee after the employee enters his or her name into the onboarding portal. The employee scans the QR code using his or her mobile phone, which has been previously listed by the employer as a device owned or used by that employee, and the mobile phone sends a confirmation code to the onboarding portal, allowing the employee access to the portal.

The term "message" as used herein means a discrete communication sent through a messaging service containing text, or images, or audio, or video, or any combination thereof.

The term "messaging service" as used herein means any service by which at least two parties may engage in conversations in the form of messages.

The term "monitored user" as used herein means the user profile of any person or entity that is monitored for compliance by the system. In one embodiment, the monitored user may be an employee of a company that is subject to regulatory compliance, such as in the financial industry.

The term "monitored user device" as used herein means a computing device of a monitored user that is capable of sending and receiving messages.

The term "user profile" means any profile, account, or registration on a computer, computer system, network, website, or other system associated with a particular user.

Conceptual Architecture

FIG. 1 is an illustration of an exemplary system architecture 100 for a system 105 for a platform for automated social media monitoring according to various embodiments of the invention. System 105 may comprise a user frontend 110, a backend application programming interface (API) 113, a workflow service 116, a social media data storage 119, a social media collection service 120, a compliance monitoring engine 130, and a compliance data service 140.

User frontend 110 may be a web portal, web application, mobile application, and the like; and may serve as an access point for a plurality of clients 156[a-n], wherein each client may be assigned various access privileges, for instance, administrators, managers, regular user, and the like. User frontend 110 provides functions such as notifications, monitoring dashboards, settings controls, and the like, which may differ and be granted on an access privilege basis. For example, administrative users may receive system-wide alerts of non-compliant content being found, while individual regular users may just receive a notification if one of their own postings are found to be offending.

Backend API 113 may be used by a plurality of third-party APIs 153[a-n] to allow for integration of system 105 into existing management systems. This may be desirable, for example, if a there is an existing management system already in-place, but the management system is lacking in the monitoring, and compliance training functions provided by system 105.

Workflow service 116 may be a central bus, and queueing service connects the various components of system 105. Workflow service 116 may queue requests, and route the requests to the desired components.

Social media data storage 119 may be a high-speed data store for storing raw data gathered by social media collection service 120 for use by compliance monitoring engine 130. Social media data storage 119 may also store user-uploaded reference data that may be used in analyzing and processing other information, such as, pictures of settings and landmarks, such as an office or a trading floor; documents, such as legal contracts, non-disclosure agreements, or drafts of upcoming announcements; specify buzzwords or slang that may be related to non-compliant occurrences in a particular setting; videos; sound clips; and the like.

Social media collection service 120 may be configured to autonomously monitor and gather from a plurality of social sources 159[a-n], and may comprise a message scraper 121, a feed monitor 122, and a call monitor 123. Message scraper 121 may be configured to collect messages from messaging platforms, such as, BLOOMBERG MESSENGER, FACEBOOK MESSENGER, SLACK, directing messaging provided by other social media platforms like TWITTER or INSTAGRAM, and the like.

Feed monitor 122 may be configured to monitor social media feeds, corporate websites, news feeds, and the like. To ensure a level of privacy, feed monitor 122 may be adjusted in how deep and thorough it may scan a feed. For example, restricting feed monitor 122 to scanning of a particular employee's feed and posted comments only, and not scan profiles of the employee's friends or followers to avoid invasion of privacy of users which have not granted permission for their feeds to be monitored. Feed monitor 122 may comprise, for example, a set of micro-services that gather raw data from social media channels and pass them through the Kafka messaging topic to a data processing module.

Call monitor 123 may be configured to monitor and messaging services in real time.

Compliance monitoring engine 130 may be a distributed computing cluster, such as APACHE SPARK, configured to processing data from social media data storage 119 for non-compliant content, and may use a plurality of modular machine learning (ML) models and services to process data that may improve over time as more content is captured and processed. ML models and services of compliance monitoring engine 130 may include, but is not limited to, an image analyzer 131, a natural language (NL) analyzer 132, a metadata analyzer 133, an automatic speech recognition (ASR) service 134, which may perform spoken audio to text transcription for speech analysis by the NL analyzer 132.

Image analyzer 131 may be configured to analyze images and videos to look for visible text, or identifiable markers provided by user-provided reference data. Visible text may be subject to optical character recognition (OCR), and passed to NL analyzer 132 for processing. Image analyser 131 may be implemented, for example, by a customized implementation of image processing and object detection logic based on YOLO V3 framework.

NL analyzer 132 may be configured to analyze text content, and transcribed audio for non-compliant content such as certain wordings, unintentional endorsements, sentiment indicators, buzzwords, and the like. This may be based on predefined rules set by administrative users, or user-provided reference data. NL analyzer 132 may also utilize fuzzy-logic in analyzing text.

Metadata analyzer 133 may be configured to analyze metadata of social media postings, and other communications data, such as, geotags, timestamps, and the like. For example, geotag info may place the origin of a social media posting made by a current employee at a restricted location, for instance, a competitor's office building. This may be used as additional context for processing of other data that may otherwise be deemed to be allowable under normal circumstances.

ASR service 134 may be configured to transcribe audio for processing by NL analyzer 132. ASR service 134 may also be configured to analyze voice imprints as a means for identification of parties involved.

It should be appreciated that compliance monitoring engine 130 may also be configured to recognize patterns within social media postings and other monitored communications to find occurrences of suspicious activity. This may provide an added benefit to users who have their accounts monitored, and may also serve as a means for proactive detection of possible vectors for data breaches.

Compliance data service 140 may be a server for general information, which may include, users, tests, reports, records, and the like. Compliance data service 140 may comprise a compliance record 141, a compliance trainer 142, a compliance database 143, and a rules engine 144 for storing the information. Compliance database 143 may be used to store data such as user-defined compliance rules, compliance records, compliance training records, compliance training materials, and the like. Compliance database 143 may also be used as an additional means of storing user-provided samples of non-compliant content, described above. Rules engine 144 may perform processing of data, for example, from Kafka topics against defined business rules, and may include intregration with image analyser 131 and NL analyser 132.

Compliance record 141 may be configured to keep records of compliance and non-compliance to show that a reasonable effort is continuously being made to maintain compliancy, and may store records in compliance database 143. Compliance record 141 may also keep track of statuses of current employee compliance training, and certifications. In some embodiments, records may be stored using a blockchain 150, which may be a timestamped, transparent, and tamperproof means of keeping a record of compliance. In addition to serving as a ledger for maintain compliance, smart contracts, an add-on technology of blockchain 150, may be used to capture compliance rules and user acceptance of monitoring.

Compliance trainer 142 may be configured to provide a compliance training program for users, and administer compliance knowledge testing. Compliance training and testing may be sent to a monitored user device (not shown) from the compliance trainer 142 based on the monitored user's record of compliance as indicated in the compliance record 141 and stored in the compliance database 143. Testing may be administered periodically on a set schedule to ensure employees know the rules, and clients may be notified when a test is required. Tests may vary based on job position. For example, executives and managers may be required to undergo and pass a more stringent test due to their access of more sensitive information.

Rules engine 144 may be configured to allow a user to create and manage compliance rules, which may be used by compliance monitoring engine 130 as a basis for non-compliant content.

In addition to the enterprise and legal applications described above, system 105 may be used for general purposes, for example, as a tool for parents to monitor their child's online activity, or monitoring of students.

Figure 9:
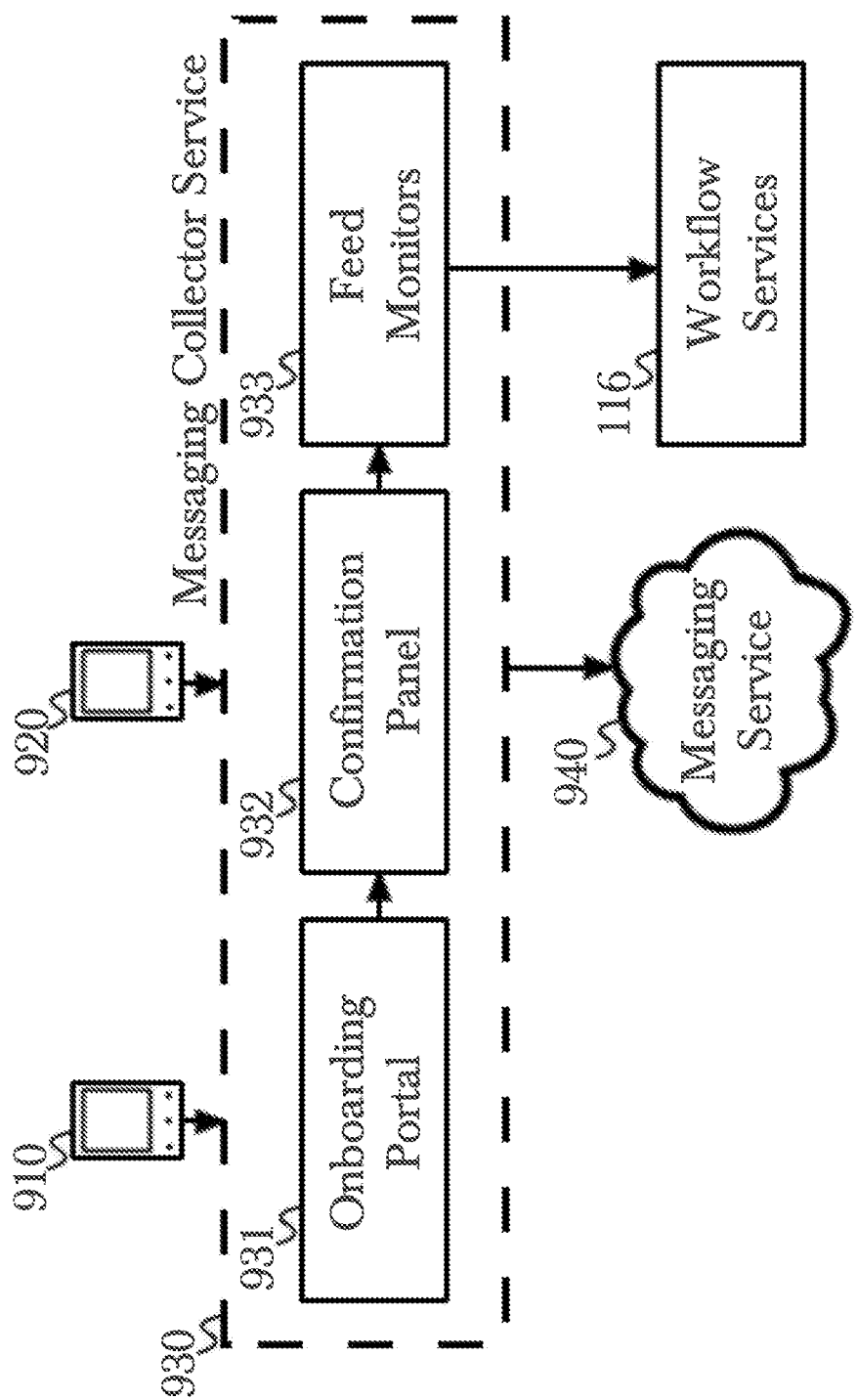
FIG. 9 is a system diagram illustrating the connections between components involved in the function of a messaging collector service.

FIG. 9 is a system diagram illustrating the connections between components involved in the function of a messaging collector service. Personal devices 910 such as personal phones, PDA's, tablets, and similar, as well as company devices 920 which may be the same sorts of devices but registered for corporate use, connect to a messaging collector service 930, containing subcomponents consisting of an onboarding portal 931 for managing new user sessions, a confirmation panel 932 to confirm user logins and settings, and feed monitor components 933 to monitor user messages once logged in. Workflow services 116, are connected to a feed monitor 933, which provides services to optimize workflow messaging such as automated scheduling services provided based on a parsing of user messages. Feed monitor 933 may retrieve a list of user profiles associated with a monitored user device 910, 920 to monitor for compliance. Each user profile may correspond with a messaging service 940, and at least one conversation on that messaging service 940. A message service 940 may be SMS text messaging, SKYPE™ messaging, or other forms of text communication common to computer devices.

Figure 10:
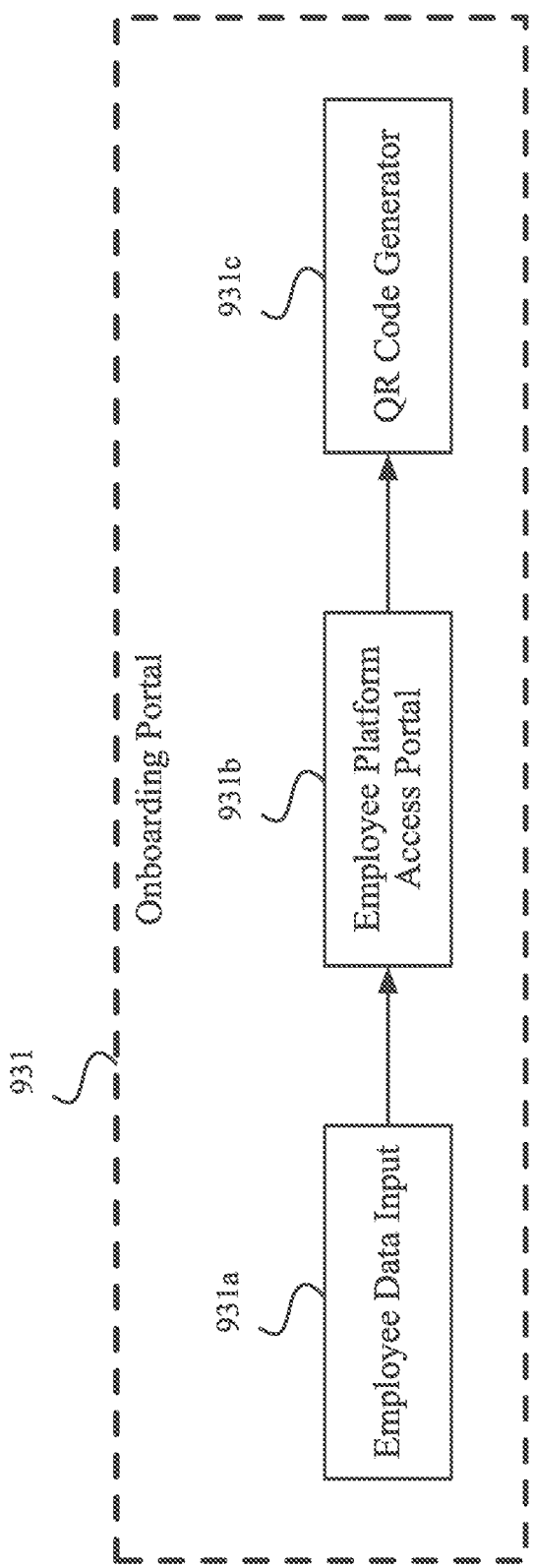
FIG. 10 is a system diagram illustrating the connections between subcomponents in an onboarding portal, according to a preferred aspect.

FIG. 10 is a system diagram illustrating the connections between subcomponents in an onboarding portal 931, according to a preferred aspect. Employee data input 931a is provided upon creation of a new user session via an onboarding portal 931, where a user may enter data such as employer ID, name, job title, and other dynamic information according to an aspect. An employee platform access portal 931b provides an opportunity for employees to log into any tertiary services including integration tools for applications on a client device 910, 920. A QR code generator 931c may generate QR codes with which to use in other applications on a client device 910, 920 for integration and additional functionality.

DETAILED DESCRIPTION OF EXEMPLARY ASPECTS

Figure 2:
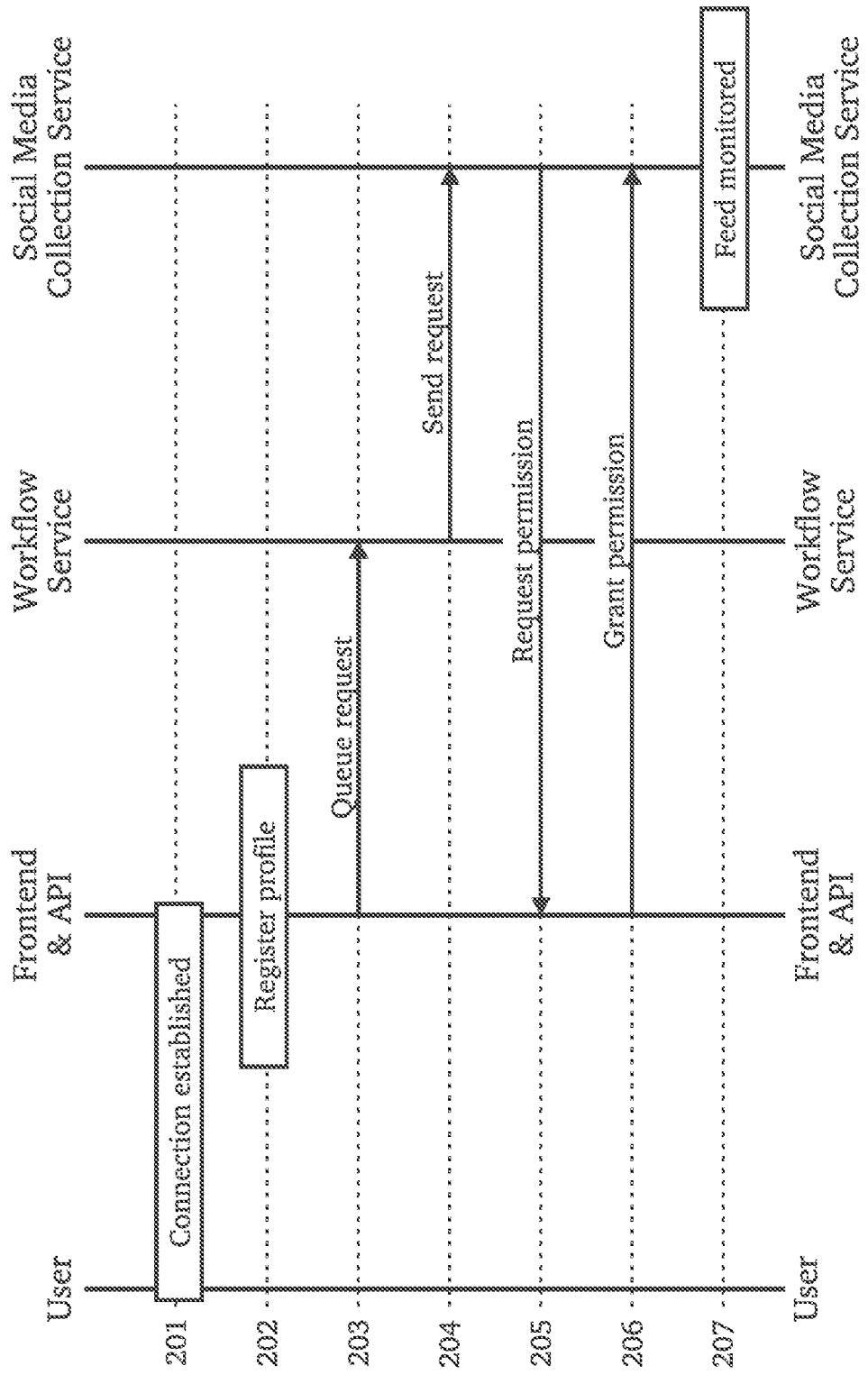
FIG. 2 is a sequence flow diagram illustrating an exemplary sequence for a user registering a new feed to be monitored according to various embodiments of the invention.

FIG. 2 is a sequence flow diagram illustrating an exemplary sequence 200 for a user registering a new feed to be monitored according to various embodiments of the invention. At an initial step 201, a user connects to a social media monitoring system 100. At step 202, the user chooses to register their social media profile. At step 203, the request is queued to a workflow service. At step 204, the request is sent to the social media collection service. At step 205, the social media collection service requests permission to access and monitor the profile from the user. If an API is available, system 105 may utilize the API to monitor the profile. If not, a periodic hypertext transfer protocol (HTTP) request to gather information. At step 206, the user grants monitoring permission. At step 207, the social media collection service continuously monitors the feed.

Figure 3:
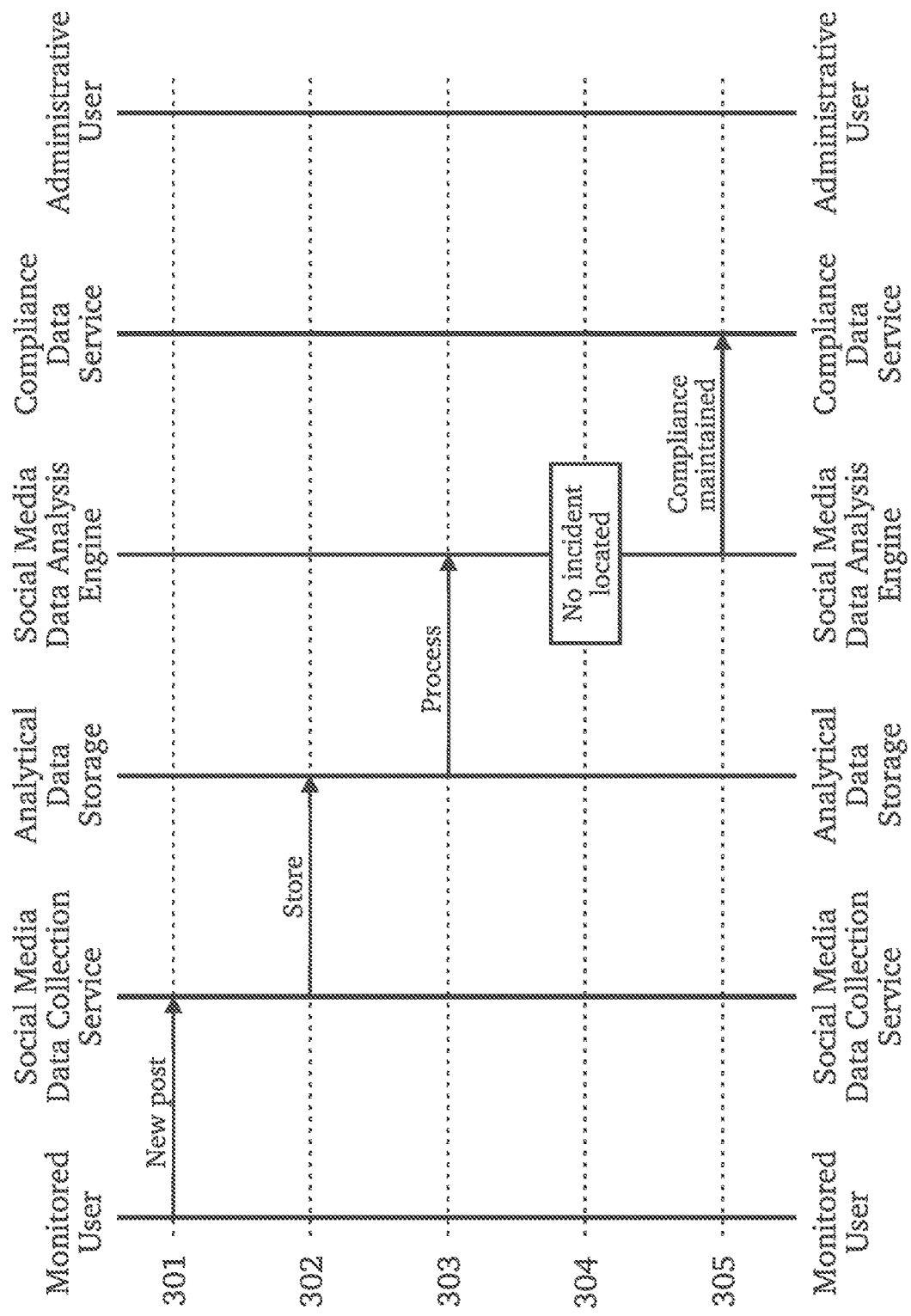
FIG. 3 is a sequence flow diagram illustrating and exemplary sequence for processing allowable content according to various embodiments of the invention.

FIG. 3 is a sequence flow diagram illustrating and exemplary sequence 300 for processing allowable content according to various embodiments of the invention. At an initial step 301, a new post is created, and is retrieved by a feed monitor along with metadata regarding the post. At step 302, the gathered data is stored into a social media data storage. At step 303, the data is processed and analyzed by a compliance monitoring engine. At step 304, the compliance monitoring engine determines that the post doesn't contain any sensitive or infringing content. At step 305, record of compliance may be logged, if required, and no further action is required.

Figure 4:
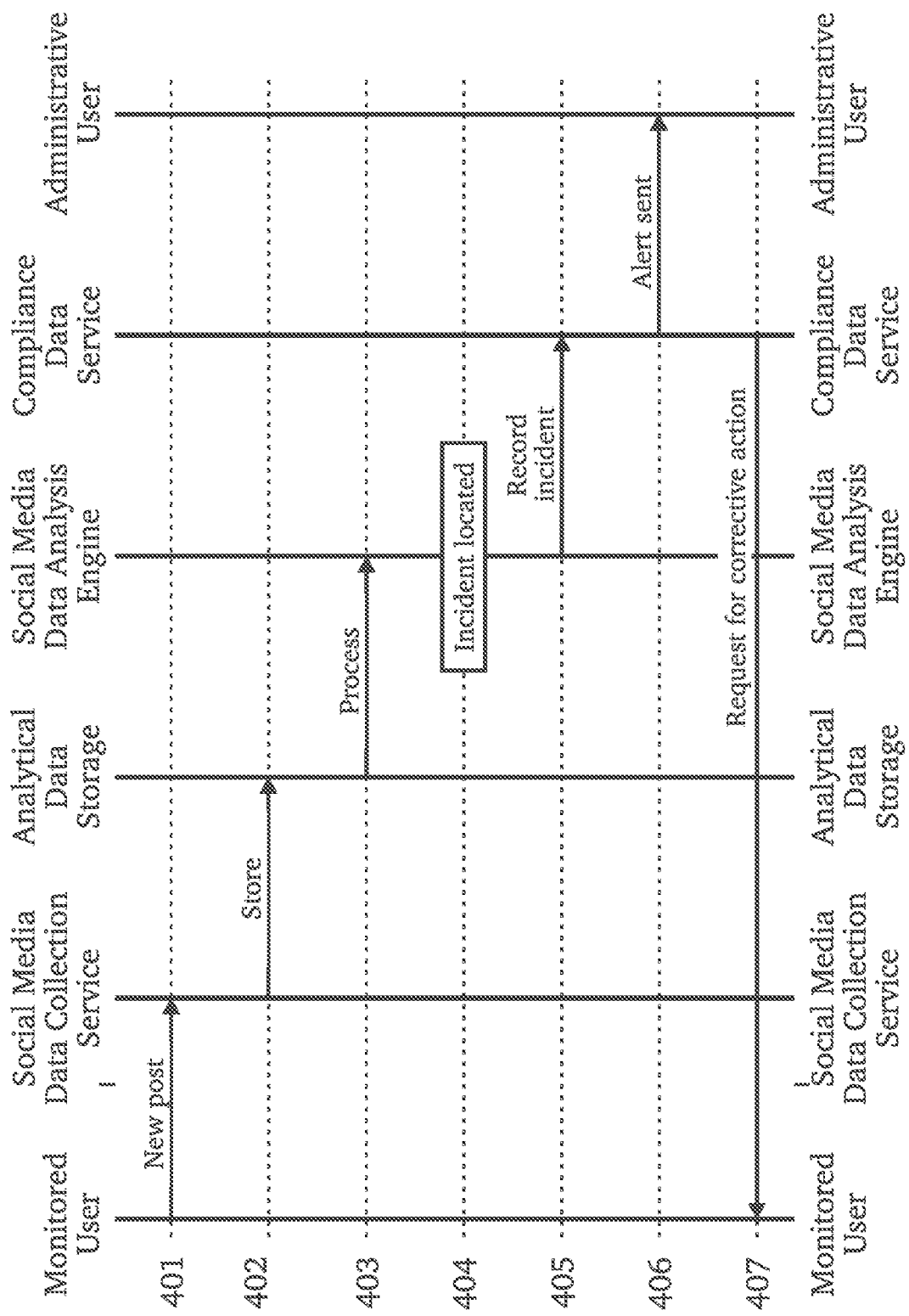
FIG. 4 is a sequence flow diagram illustrating an exemplary sequence for processing non-compliant content according to various embodiments of the invention.

FIG. 4 is a sequence flow diagram illustrating an exemplary sequence 400 for processing non-compliant content according to various embodiments of the invention. At an initial step 401, a new post is created and retrieved by a feed monitor on a social media feed of a monitored user. At step 402, the data is stored into a social media data storage. At step 403, the data is processed and analyzed by a compliance monitoring engine. At step 404, the compliance monitoring engine locates and recognizes non-compliant content in the data. At step 405, a record of the incidence of noncompliance is recorded. At step 406, an alert is sent administrative users or personnel. At step 407, a notification is sent the offending monitored user to take immediate corrective action.

Figure 5:
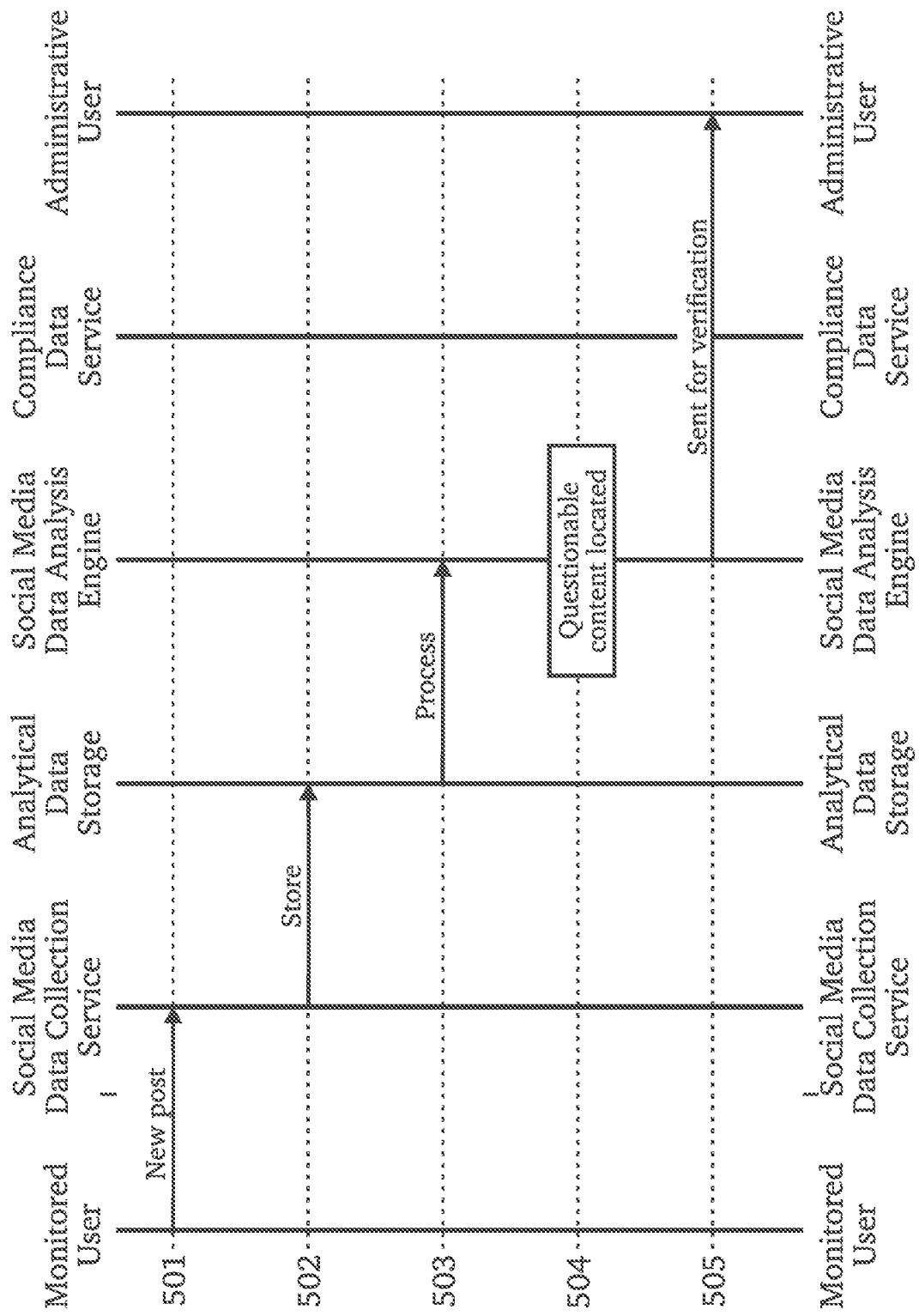
FIG. 5 is a sequence flow diagram illustrating an exemplary sequence for processing uncertain content according to various embodiments of the invention.

FIG. 5 is a sequence flow diagram illustrating an exemplary sequence 500 for processing uncertain content according to various embodiments of the invention. At an initial step 501, a new post is created and retrieved by a feed monitor on a social media feed of a monitored user. At step 502, the data is stored into a social media data storage. At step 503, the data is processed and analyzed by a compliance monitoring engine. At step 504, the compliance monitoring engine locates questionable content in the data, but is uncertain regarding its compliancy. At step 505, the content is sent to an administrative user to manually verify, and given the decision-making power. Depending on how the content to classified, may end up with results similar to FIG. 3 or 4.

Figure 6:
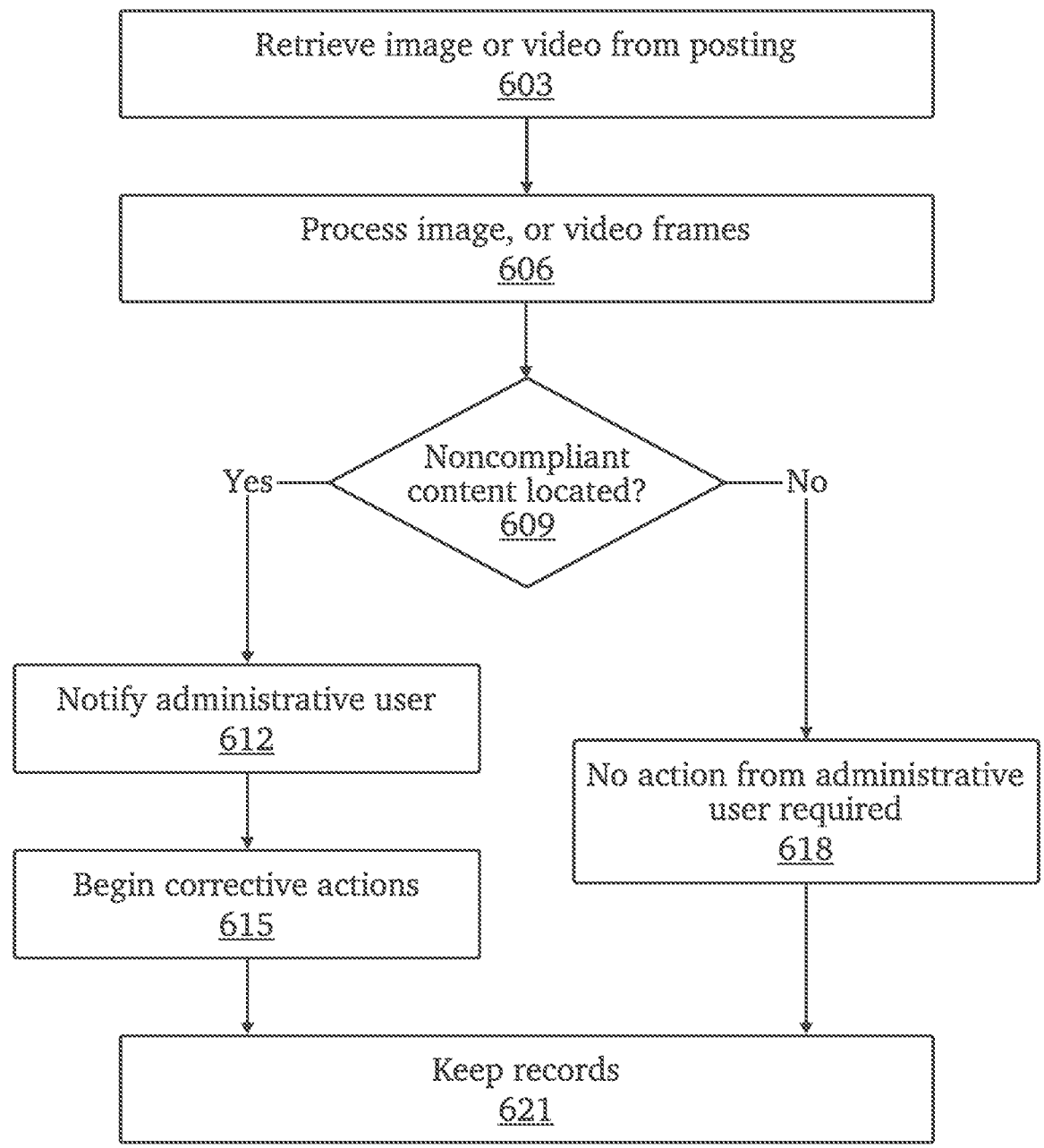
FIG. 6 is a flowchart illustrating a method for processing image or video data for non-compliant content according to various embodiments of the invention.

FIG. 6 is a flowchart illustrating a method 600 for processing image or video data for non-compliant content according to various embodiments of the invention. At an initial step 603, images or video data may be retrieved. The source may be a social media feed, a messaging service, and the like. At step 606, the image or frames of the video are analyzed and processed, which may entail, but is not limited to, OCR of visible text; transcription of included audio; and using image recognition models to identify faces, landmarks, indoor settings, and the like. OCR'ed text and transcriptions may be sent to be processed with a natural language processor. Metadata, such as geotags and timestamps, may be used to provide more context, and may yield more accurate results. At step 609, the processed data is assessed to determine if it contains any non-compliant content. If non-compliant content is found, administrative users or personnel are notified of the infraction at step 612. At step 615, corrective actions may be set into motion. For example, if system 105 determines, with little or no uncertainty, the content may be automatically flagged, and the originator the content is notified to take immediate action. But if system 105 is uncertain, the content may be deferred to administrative users or personnel to make the final decision, which may result in moving to step 618, if the content is deemed allowable. At step 621, a record is kept of the infraction.

On the other hand, if no non-compliant content is found, system 105 determines that actions from administrators or other personnel are not required at step 618, and system 105 may put into records that no incident of non-compliance has occurred at step 621.

Figure 7:
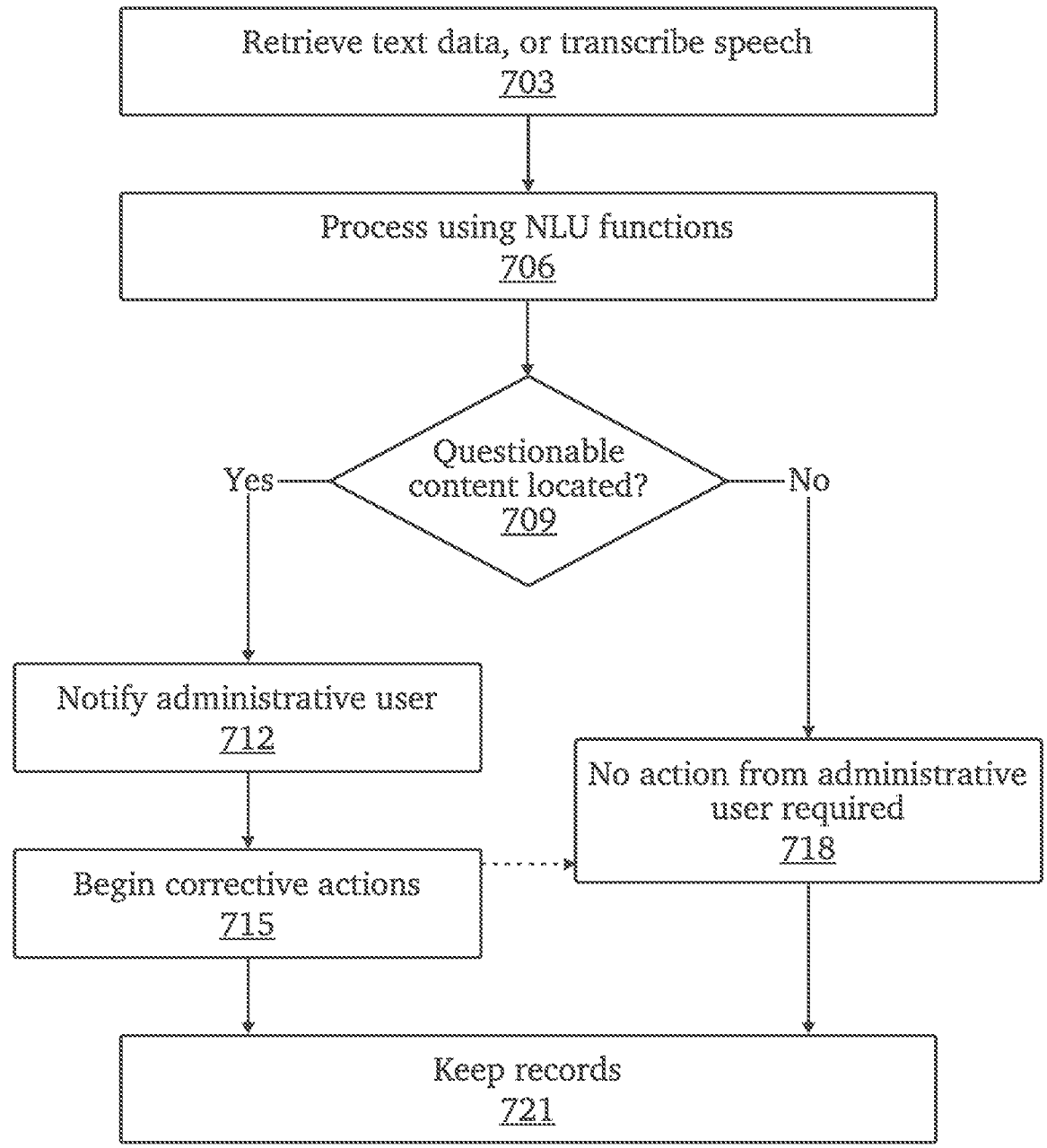
FIG. 7 is a flowchart illustrating a method for natural language data for non-compliant content according to various embodiments of the invention.

FIG. 7 is a flowchart illustrating a method 700 for natural language data for non-compliant content according to various embodiments of the invention. At an initial step 703, text data is retrieved. The source may be a text post, messaging, transcribed audio, and the like. At step 706, the data may be processed by the NL analysis functions of the compliance monitoring engine. At step 709, the processed data is assessed to determine if it contains any non-compliant content. If non-compliant content is found, administrative users or personnel are notified of the infraction at step 712. At step 715, corrective actions may be set into motion. For example, if system 105 determines, with little or no uncertainty, the content may be automatically flagged, and the originator the content is notified to take immediate action. But if system 105 is uncertain, the content may be deferred to administrative users or personnel to make the final decision, which may result in moving to step 718, if the content is deemed allowable. At step 721, a record is kept of the infraction.

Figure 8:
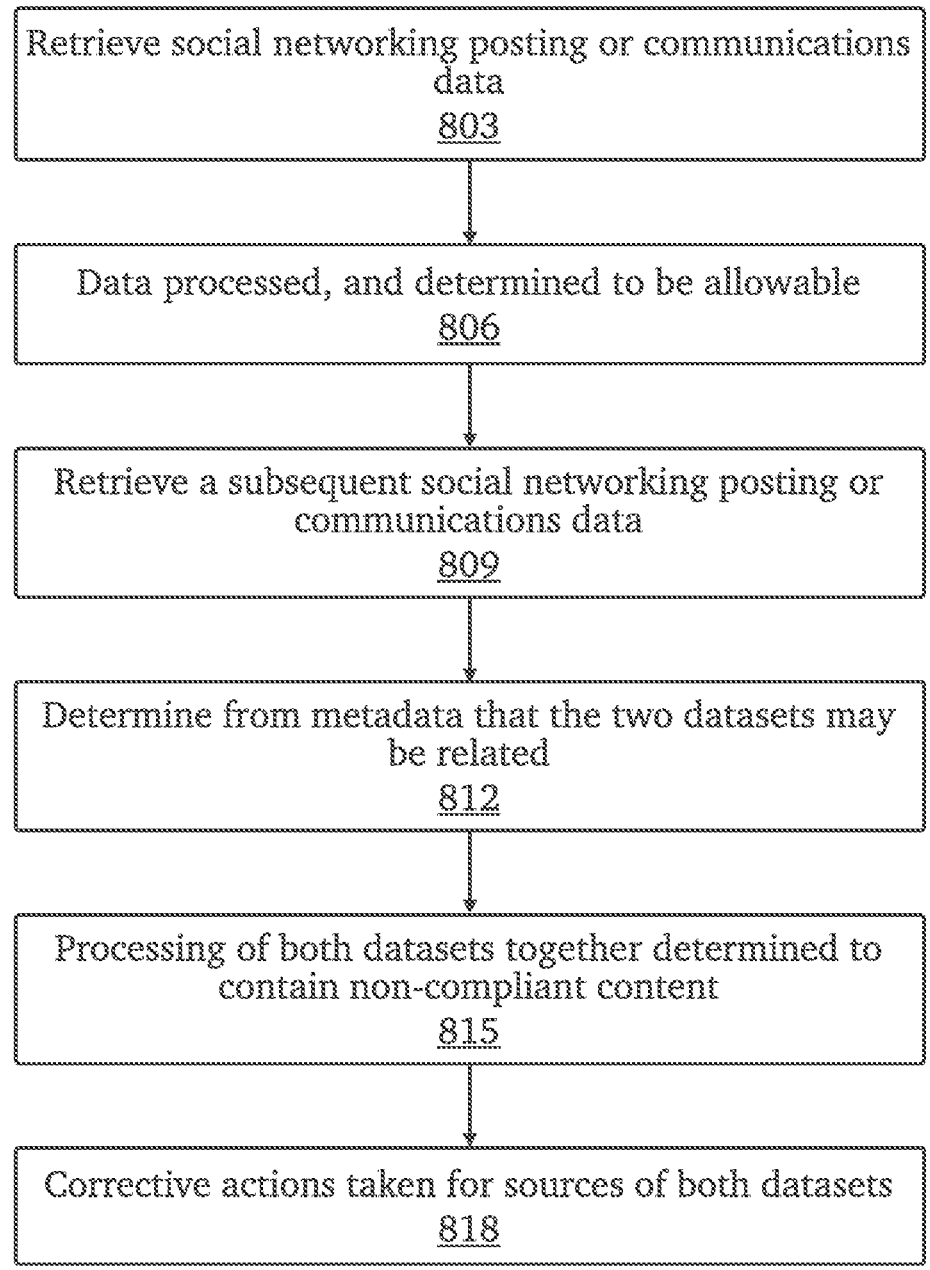
FIG. 8 is a flowchart illustrating an exemplary method for contextual processing of associated communications or postings according to various embodiments of the invention.

FIG. 8 is a flowchart illustrating an exemplary method 800 for contextual processing of associated communications or postings according to various embodiments of the invention. At an initial step 803, a social media posting, or communications data is retrieved. The source maybe from a monitor social media feed, messaging service, voice calls, and the like. At step 806, the data is processed with the compliance monitoring engine, and determined to be allowable. At step 809, a subsequent social media posting, or communications data is retrieved. At step 812, system 105 determines that the earlier posting, and current posting may be related through analysis of metadata of each posting. For example, the postings, which may be on different social media services, are on accounts belonging to one user, or the location information or timestamps may be determined to be suspicious. At step 815, both postings are processed with the compliance monitoring engine using the added context, and the contents of both postings are determined to contain non-compliant content. At step 818, correction actions are taken for both datasets, and incidents are recorded.

Figure 15:
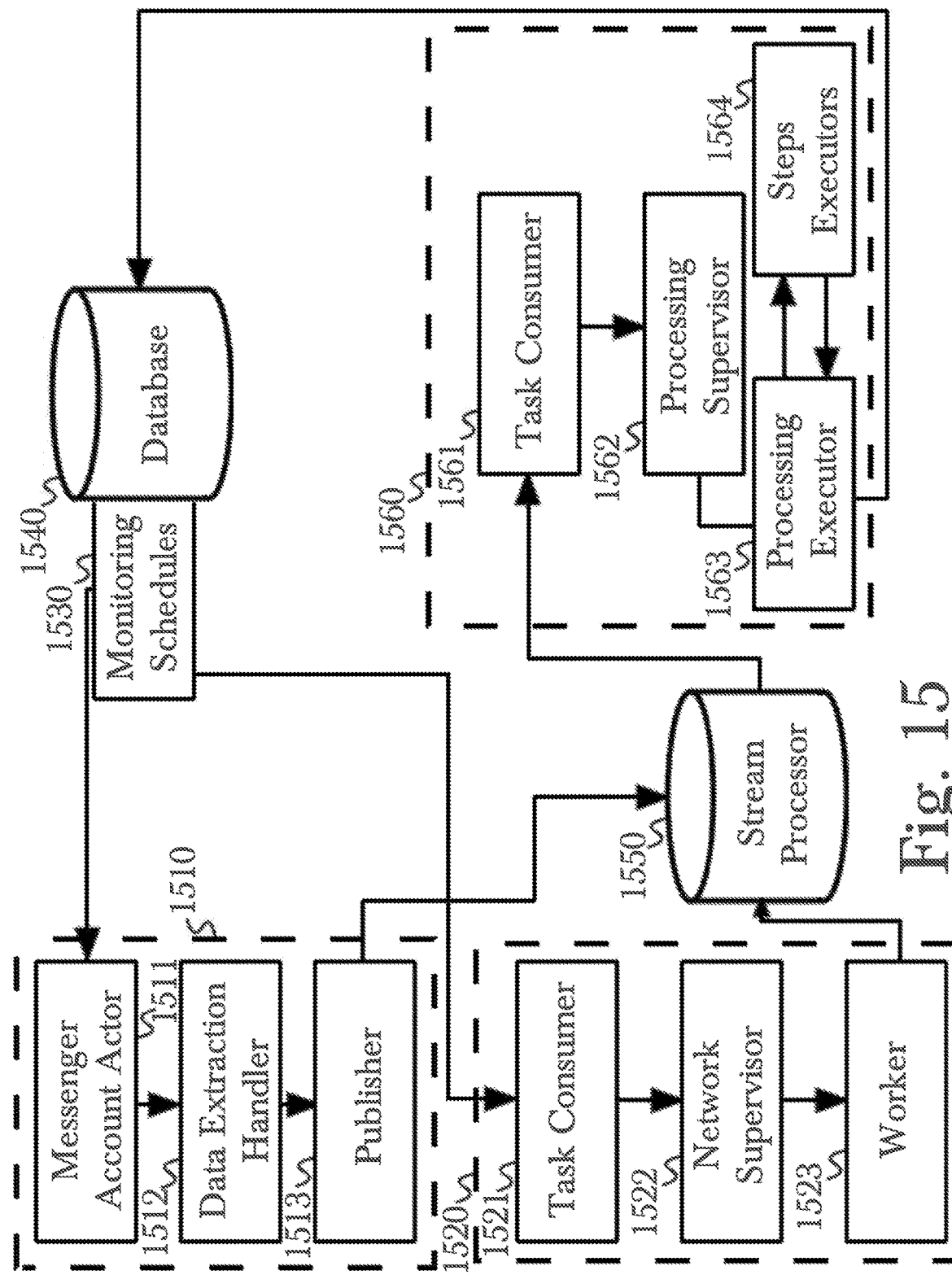
FIG. 15 is a block diagram illustrating interactions between several components of the system, according to an aspect of an embodiment.

FIG. 15 is a block diagram illustrating interactions between several components of the system, according to an aspect of an embodiment. Messenger services 1510 include a messenger account actor 1511, which may access a messenger service using permissions granted by a monitored user profile. A data extraction handler 1512 may obtain communications from the monitored user profile after access is obtained. When relevant data is extracted, it may be published by a publisher component 1513 to a stream processor 1550 such as APACHE KAFKA™. Messenger service actor 1511 may operate according to schedules 1530 contained in a database 1540, the monitoring schedules 1530 also governing the consumption of data as a task consumer 1521 in a data mining module 1520. A data mining module 1520 operates on a schedule determined by monitoring schedules 1530 stored in a database 1540, using a task consumer 1521 to regularly process data from social media platforms and accounts as opposed to chat messenger applications which may be consumed by messenger services 1510. A task consumer may 1521 regularly and on a schedule 1530 execute tasks using a network supervisor 1522, before sending the requisite task processing to a worker 1523. When a task is complete and raw data from a social media account or data mining operation is gathered, raw data is sent to a stream processor 1550 which may be a software suite such as APACHE KAFKA™ or some other appropriate stream processor 1550 software component, which applies operations to each segment of a stream of data, as specified by the software configuration. With data output from messenger services 1510 using a publisher 1513, and data output from data mining services 1520 using a worker 1523, to a stream processor 1550, data which is processed by the stream processor 1550 is sent to a second task consumer 1561 which is a component in a data processing engine 1560. After a second task consumer 1561 organizes and executes tasks for processing data further, a processing supervisor 1562 may decide steps or organization for processing different pieces of data with a task, or between tasks, before sending the data to be processed in this manner by a processing executor 1563. A steps executor 1564 communicates bi-directionally with a processing executor 1563 to determine if changes in the order of data processing execution will be made, based on the outcome of processing execution 1563 as it occurs. Compliance reports may be sent to a database 1540 for storage.

Figure 16:
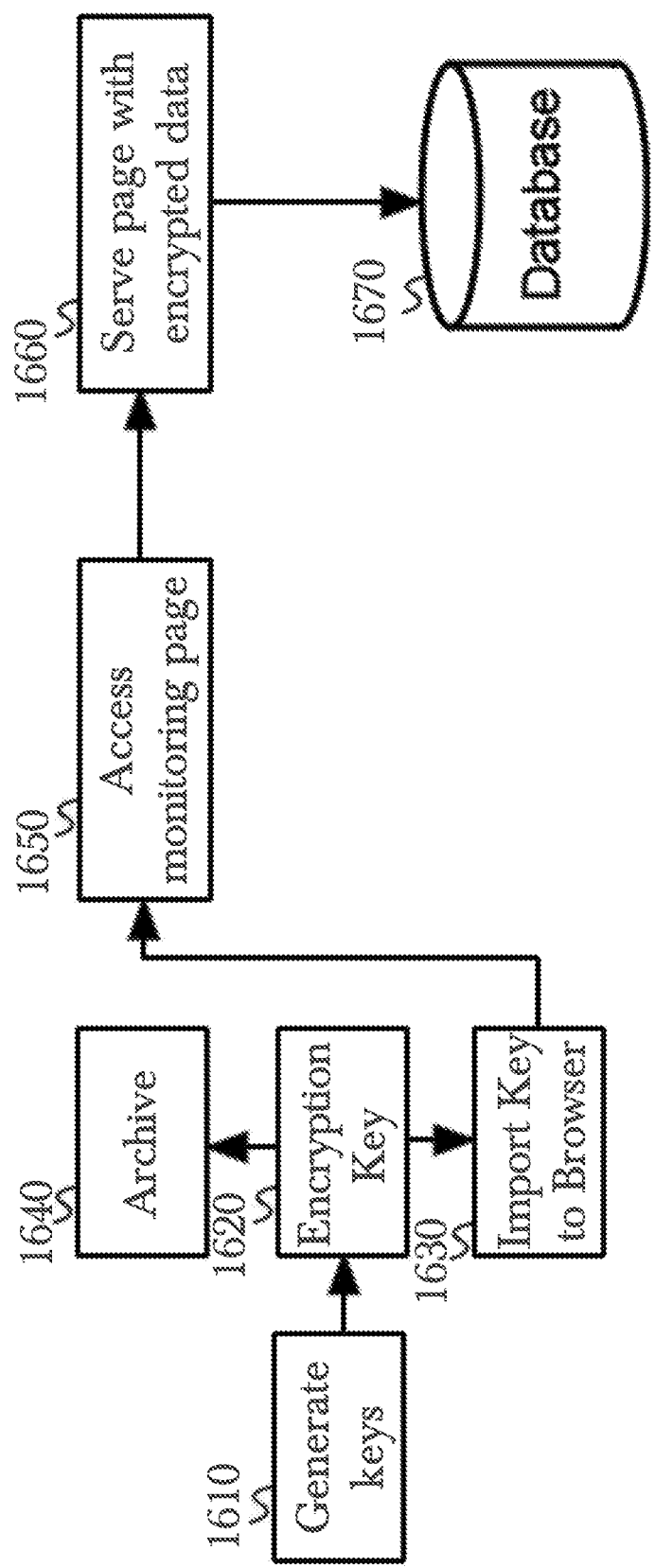
FIG. 16 is a block diagram illustrating the functionality of an asymmetric encryption option for users of the system.

FIG. 16 is a block diagram illustrating the functionality of an asymmetric encryption option for protection of data in the system. This encryption is associated with the compliance monitoring system itself, and is not associated with any encryption of messages which occurs at the messaging service. First, encryption keys 1620 are generated 1610, which may be based on 256-bit encryption, for high-security encryption which is resistant to brute-force cracking efforts. An encryption key 1620 may then be imported into a web browser 1630, in order for a user to access encrypted services such as an onboarding portal 931 or to access the monitoring page 1650 for monitoring messenger and social media activity of employees. A simultaneous step in an asymmetric encryption option for users is to archive the keys 1640. After a key is imported into a browser 1630 so that a monitoring service may be accessed securely 1650, the page may be served with encrypted data 1660 allowing a user to view this encrypted data with their key, and ensuring it is not viewable to unauthorized parties, before storing it in a database 1670 for record-keeping purposes.

Figure 17:
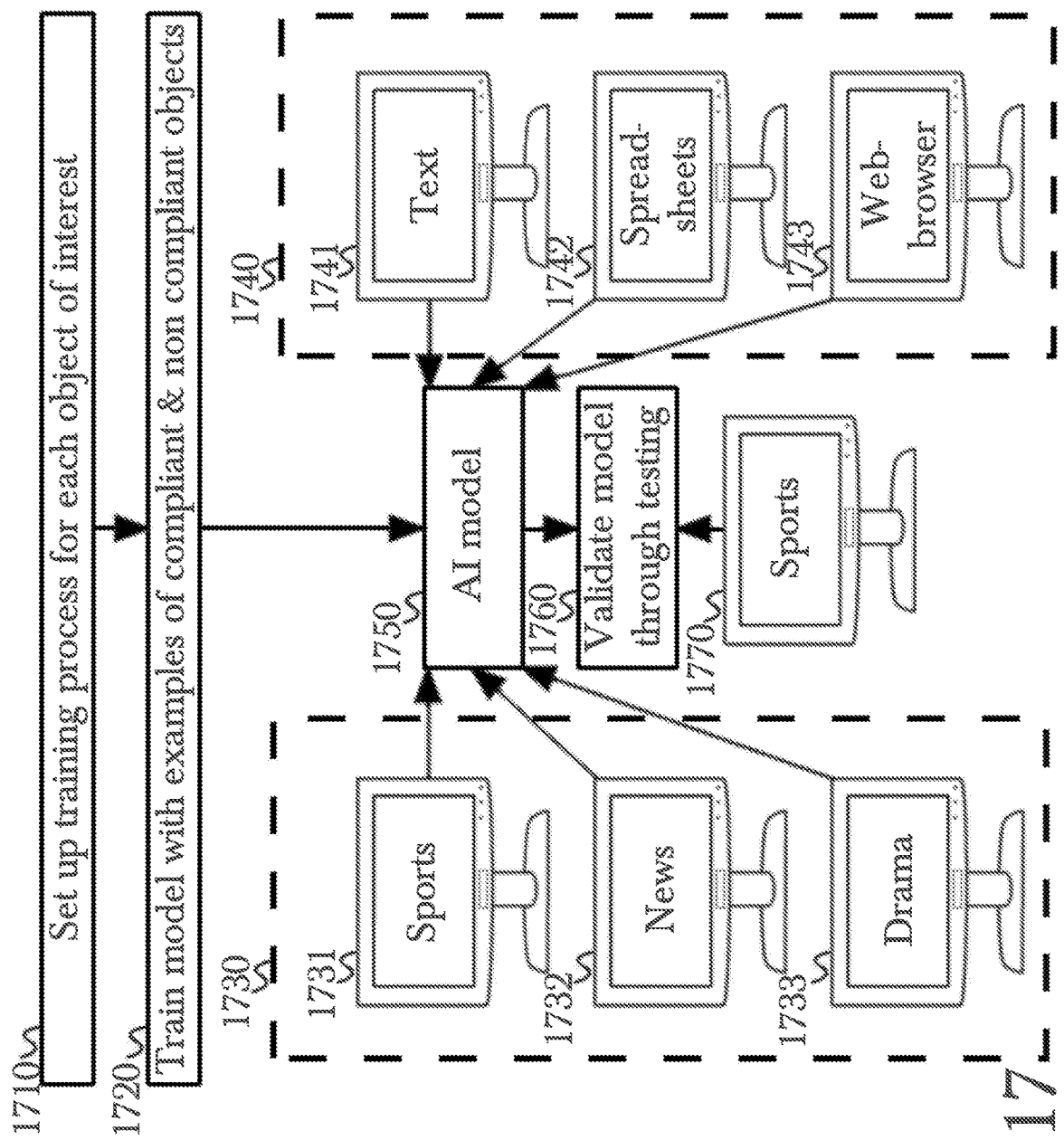
FIG. 17 is a block diagram illustrating the use of an artificially intelligent modelling engine to determine compliant and non-compliant media and data forms for an employee or other inspected individual, to reduce unnecessary invasion of privacy.

FIG. 17 is a block diagram illustrating the use of an artificially intelligent modelling engine to determine compliant and non-compliant media and data forms for an employee or other inspected individual, to reduce unnecessary invasion of privacy. A training process is set up for objects of interest 1710 in a monitoring system, which may be used to train an AI model 1750 to recognize compliant 1740 and non-compliant 1730 forms of content, using examples 1720. An AI model 1750 for the monitoring system may learn using common machine learning techniques including reinforcement learning from examples 1720, from given samples of what may be considered compliant 1740 and non-compliant 1730 content for an employee to view or be interacting with during work hours. Examples of non-compliant image objects include sports 1731 images, news images 1732, or drama, satire, or joke content 1733. Examples of compliant content for an employee to view may be images primarily of text 1741, spreadsheets 1742, or images of or from a web browser 1743, which may be used for instructional purposes in some work environments. The model 1750 may be validated through testing and teaching 1760 by feeding it examples of compliant or non-compliant images 1770, allowing the machine learning to work with user assistance.

Figure 18:
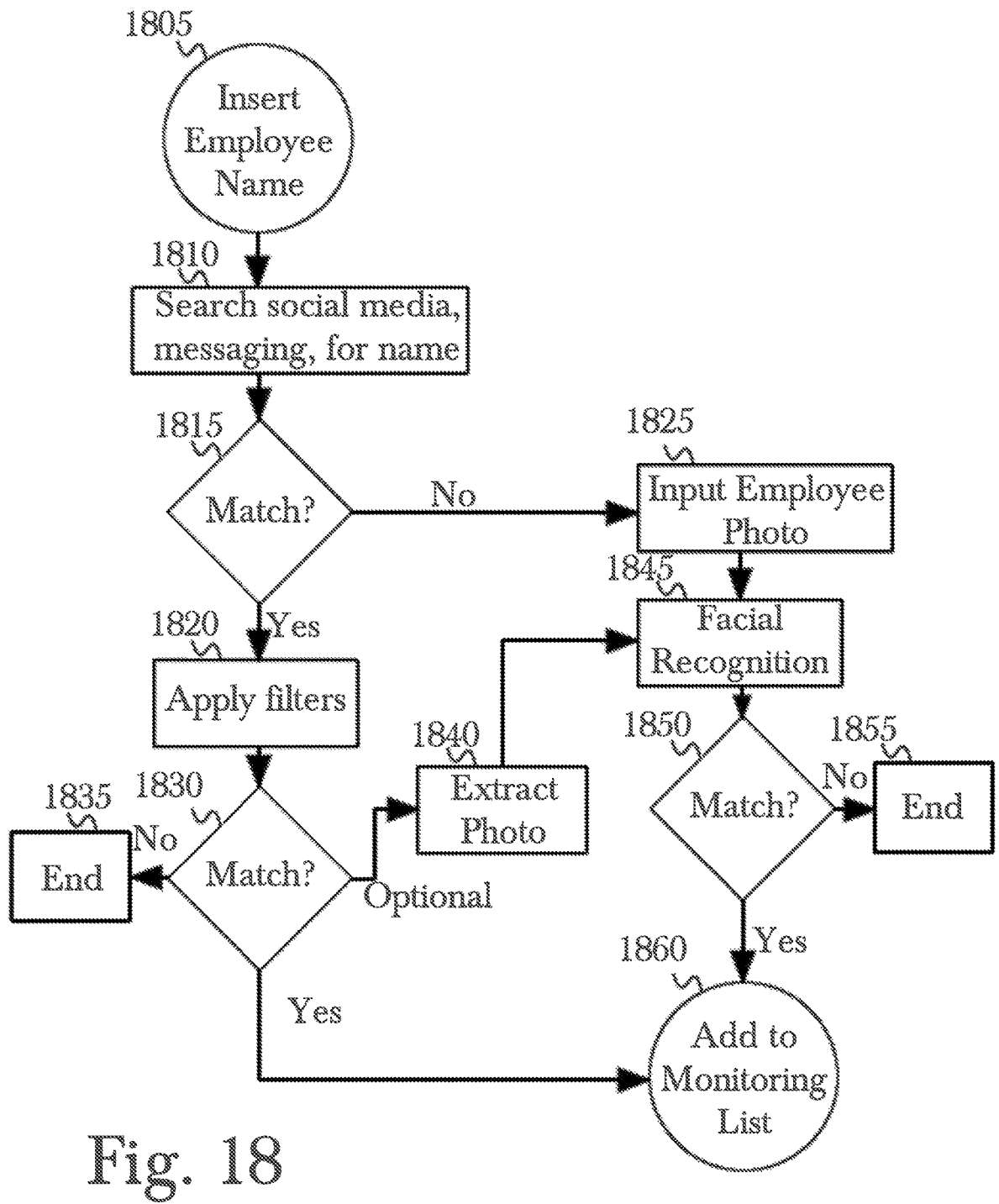
FIG. 18 is a flow diagram illustrating steps and methods for employee social media and messaging account discovery for known or removed employees, according to a preferred aspect.

FIG. 18 is a flow diagram illustrating steps and methods for employee social media and messaging account discovery for known or removed employees, according to a preferred aspect. An employee's name may be entered into a monitoring system 1805, at which time a search for social media accounts and messenger accounts with that name may be conducted 1810 using messenger services 1510 and data mining engine 1520. A check is performed for a matching name 1815, and if one is found, filters are applied 1820 for such data points as company name, company geolocation, and other relevant data as may be required for a specific implementation. If a match is still found 1830 despite the application of filters to reduce the likelihood of a false match with an individual with an identical or similar name, the account or accounts are added to a monitoring list 1860. If it does not result in a match, the process ends 1835. As an optional step, after a second match 1830, a candidate employee's photo or photos may be extracted 1840 for facial recognition attempts 1845 if applicable. If a first match 1815 attempt results in no match, indicating a current, prospective, or past employee is not located on selected messenger or social media platforms by name, their photo may be inputted 1825 for a facial recognition attempt 1845. If facial recognition 1845 efforts result in a match 1850, the matched accounts are added to a monitoring list 1860 for further review and continued monitoring. If a matching attempt 1850 proves negative, the process ends 1855.

Figure 19:
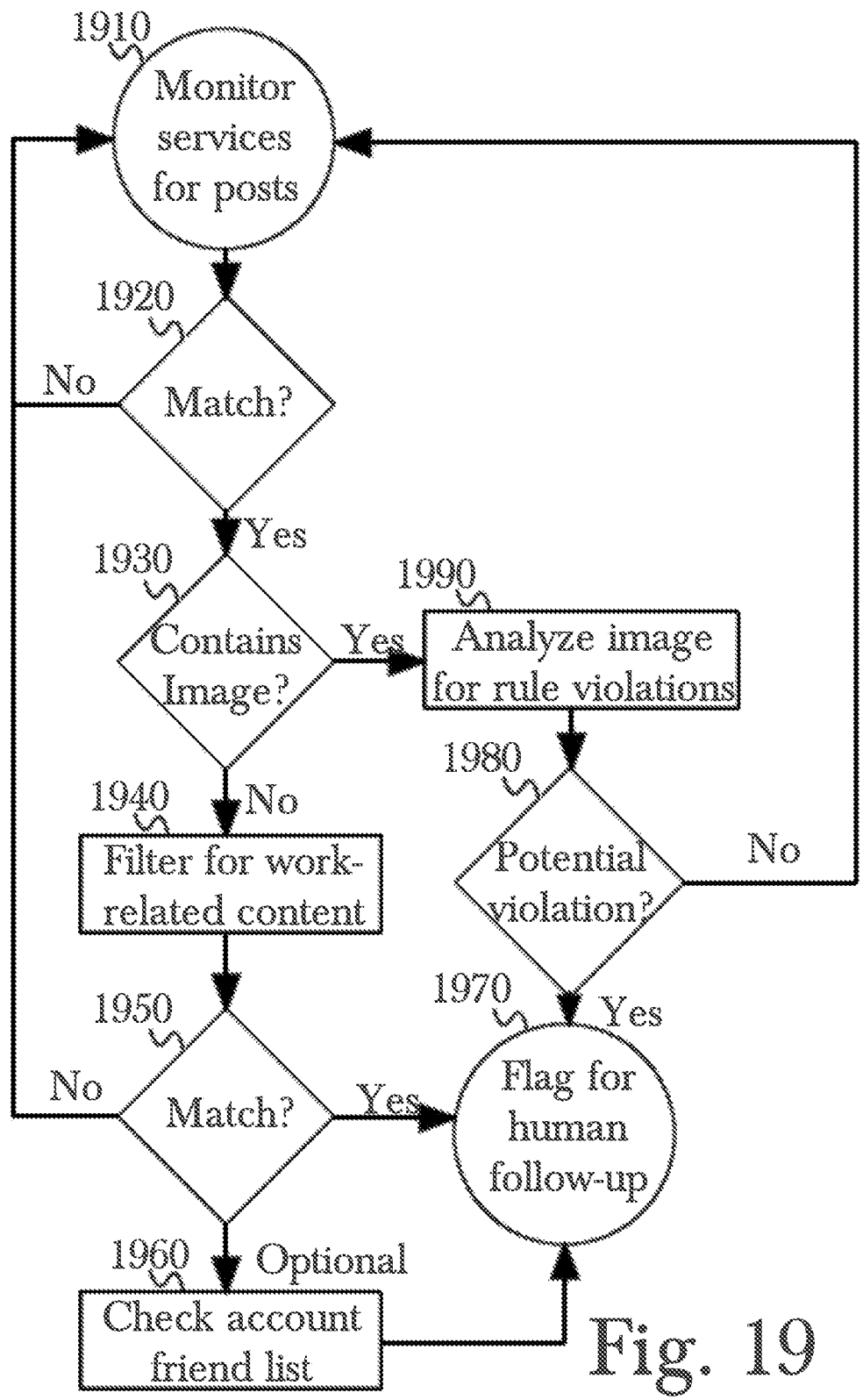
FIG. 19 is a flow diagram illustrating steps and methods for unknown or unreported employee social media and messaging accounts, according to a preferred aspect.

FIG. 19 is a flow diagram illustrating steps and methods for unknown or unreported employees and visitors' social media and messaging accounts, according to an aspect. Services and social media platforms are monitored for posts with locations matching the company's office 1910, and checked for matches 1920. If there is no match, the searching for matching posts 1910 continues. If there is a positive match 1920, a second check is performed 1930, for whether or not the message or post contains an image 1930. If the check fails, the message, messages, or other social media content, are filtered for work-related content 1940, such as related fields of interest or using keyword checks. If there is a match 1950, the message, messages, or social media accounts, are flagged for human review 1970, and optionally, the account's friend list may also be checked 1960 and listed as one of the components for review 1970. If, however, the second check, for containing an image 1930, returns a positive result, the image or images are analyzed for possible rule violations 1990, such as being non-compliant as discussed in FIG. 17. If a rule violation has occurred 1980, it is flagged for human review 1970, and if not, the system returns to monitoring for content 1910.

Figure 20:
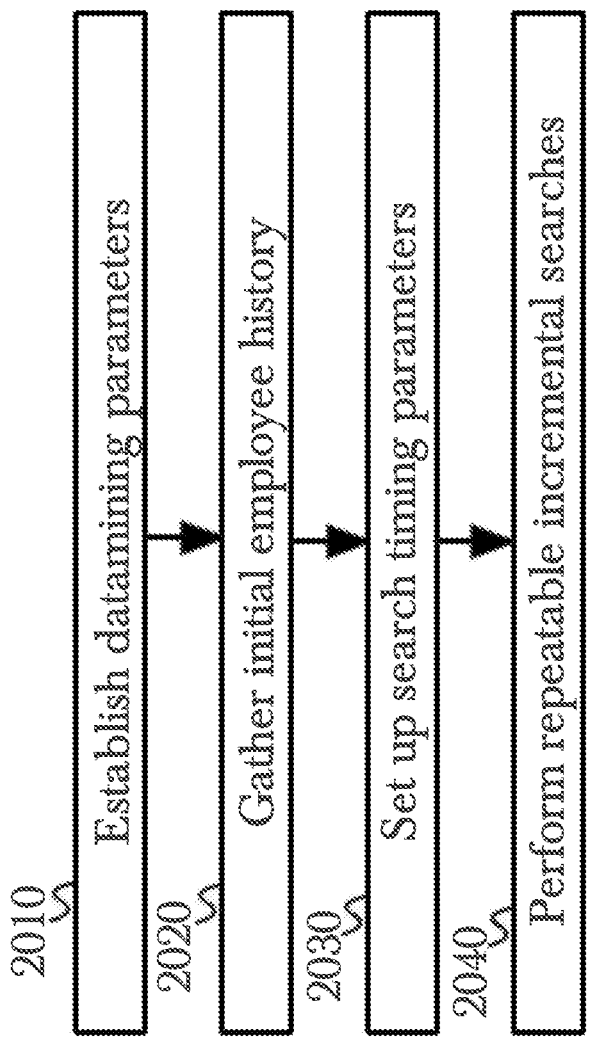
FIG. 20 is a block diagram illustrating the steps and methods taken for a feed monitor to continually find and mine new data.

FIG. 20 is a block diagram illustrating the steps and methods taken for a feed monitor to continually find and mine new data. Data mining parameters are established 2010 which govern the function of messaging services 1510 and data mining services 1520, allowing for the specification of datapoints such as date ranges, services and websites to check, and more. A past, current, or prospective employee's history may be gathered and input 2020, including possible photographs, company name and geolocation, employee name, and other applicable identifying information for a monitoring service to use. Search timing parameters may be specified 2030 which may be stored in a database 1540, in the form of monitoring schedules 1530, which specify the timing for recurring tasks for messaging services 1510 and data mining services 1520. Lastly, repeated incremental searches are performed 2040 using the components in FIG. 15, using scheduling data 1530 to determine the search repetition rate.

Figure 21:
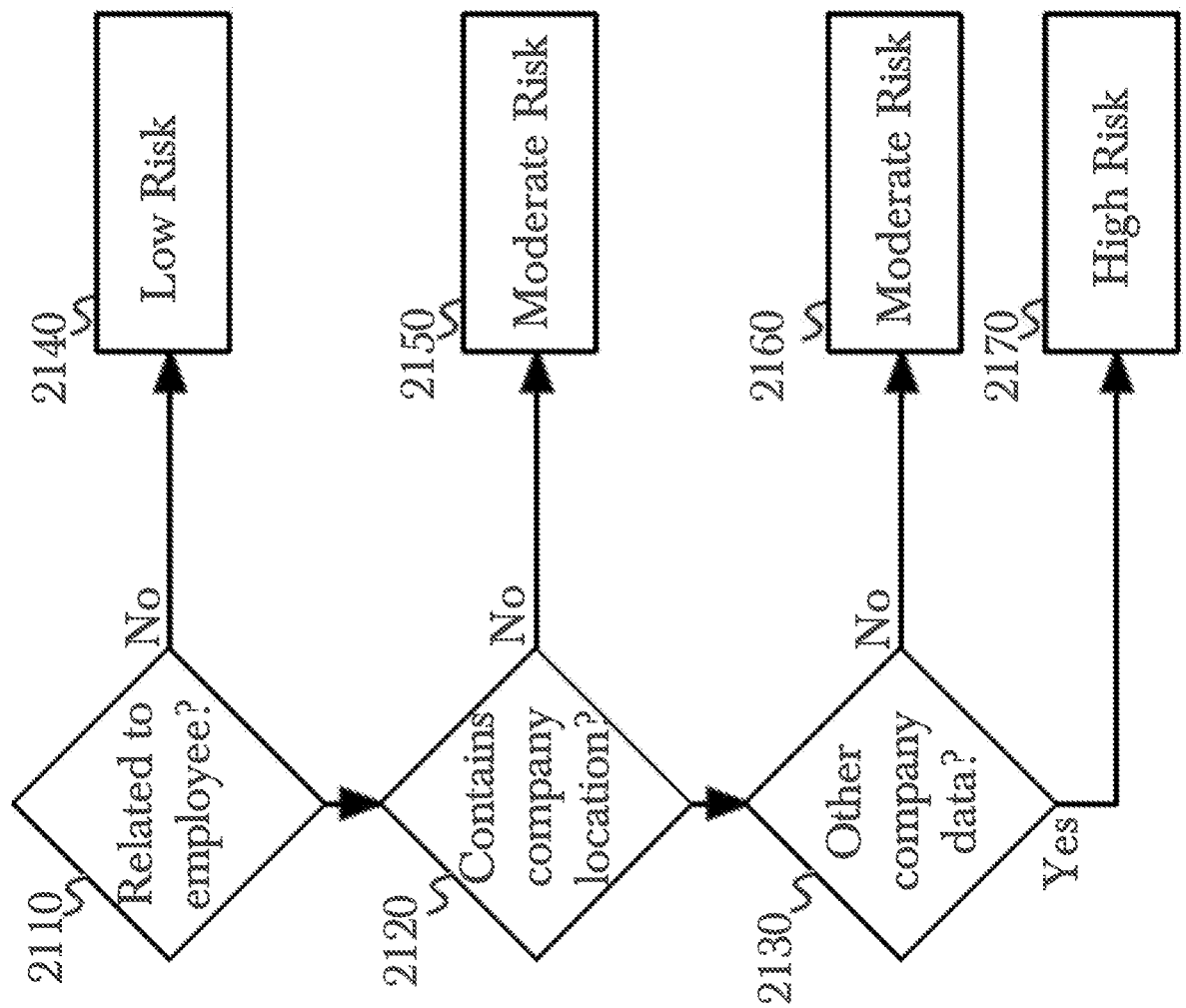
FIG. 21 is a flow diagram illustrating an exemplary and sample rules engine functionality for categorizing found datapoints and account information from an individual, assessing risk assessments for progressively more important behavior.

FIG. 21 is a flow diagram illustrating an exemplary and sample rules engine functionality for categorizing found data points and account information from an individual, assessing risk assessments, and determining the severity of a non-compliance, which may be determined using a pre-determined level of severity progression as defined by an administrative user using an administrative user device (not shown). A first possible check may be to determine if a given input, whether a sequence of messages or accounts or images, is related to an employee 2110, and if not, an account or group of data may be categorized as low risk 2140. If the check results in a positive however, a further check may be to determine if a group of messages, posts, or an account in some way contains the company geolocation 2120, and if not, categorize it as moderate risk 2150 since is still passed the first check. If the second check 2120 is passed with a positive result, a third check determines if other related company data can be located on a past, present, or prospective employee's accounts 2130, and if the check fails, a moderate risk 2160 again is assessed to a given employee's profile in the system. If this check results in a positive result, a high risk 2170 is given to them, indicating they are flagged for review. If a non-compliance is identified that exceeds a severity at or above a pre-determined level as determined by an administrative user using an administrative user device (not shown), a notification may be sent to the administrative user. The rules engine functionality is not limited to the decisions shown, and may include rules for other suspicious activity such as theft and cyberattacks.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
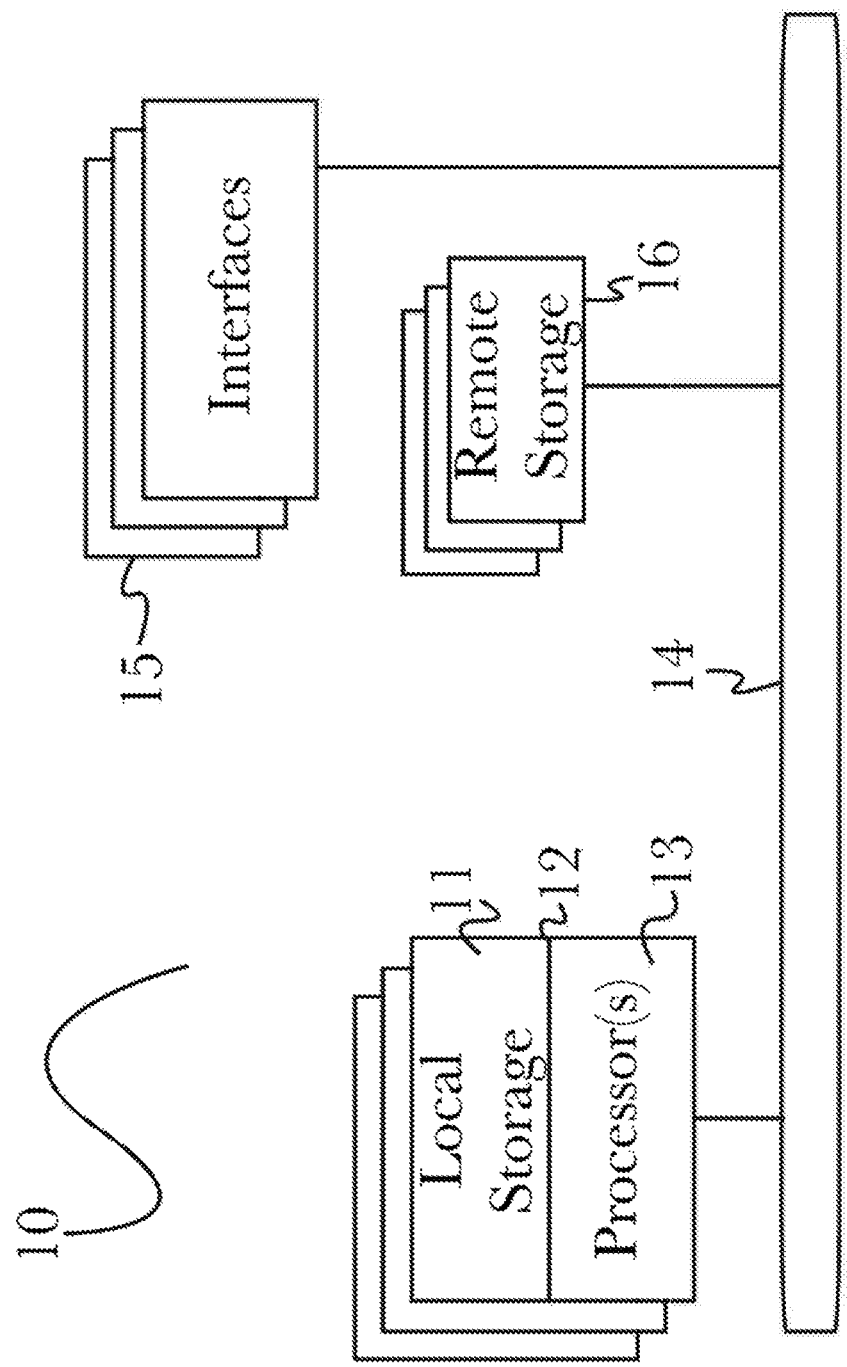
FIG. 11 is a block diagram illustrating an exemplary hardware architecture of a computing device used in various embodiments of the invention.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
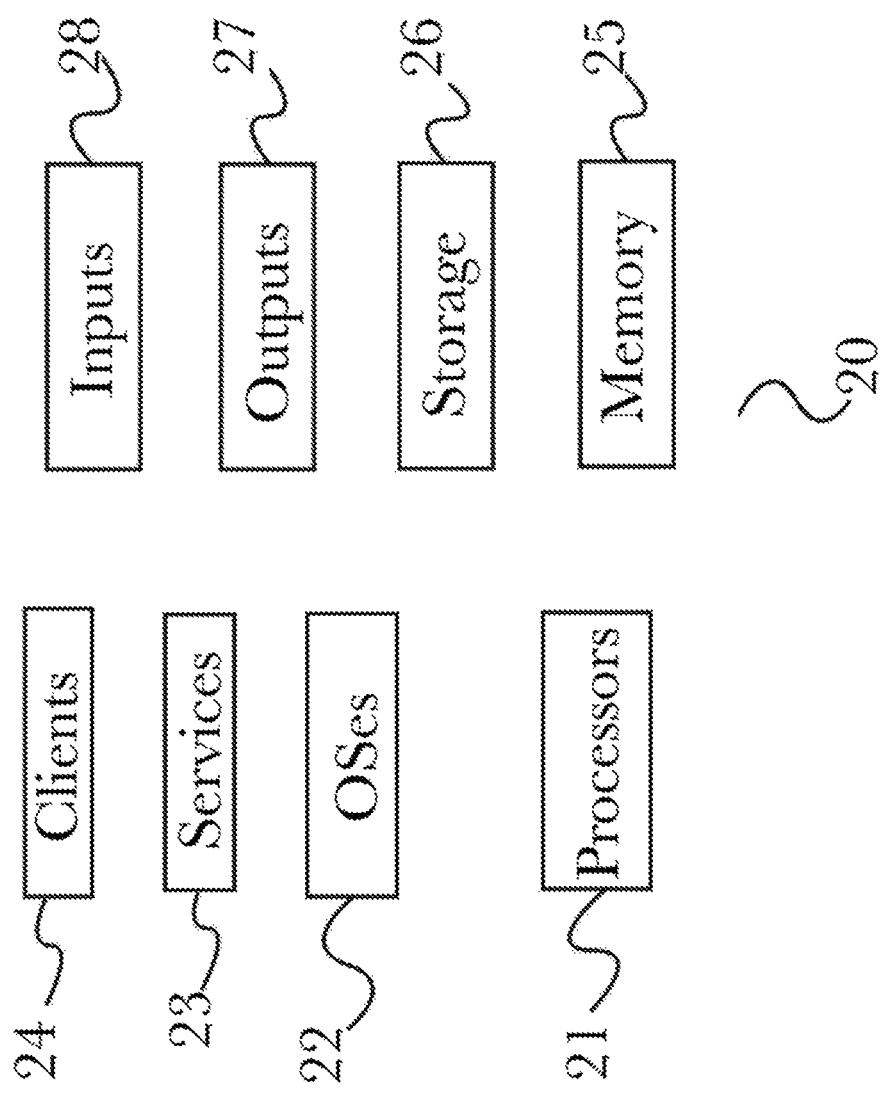
FIG. 12 is a block diagram illustrating an exemplary logical architecture for a client device, according to various embodiments of the invention.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
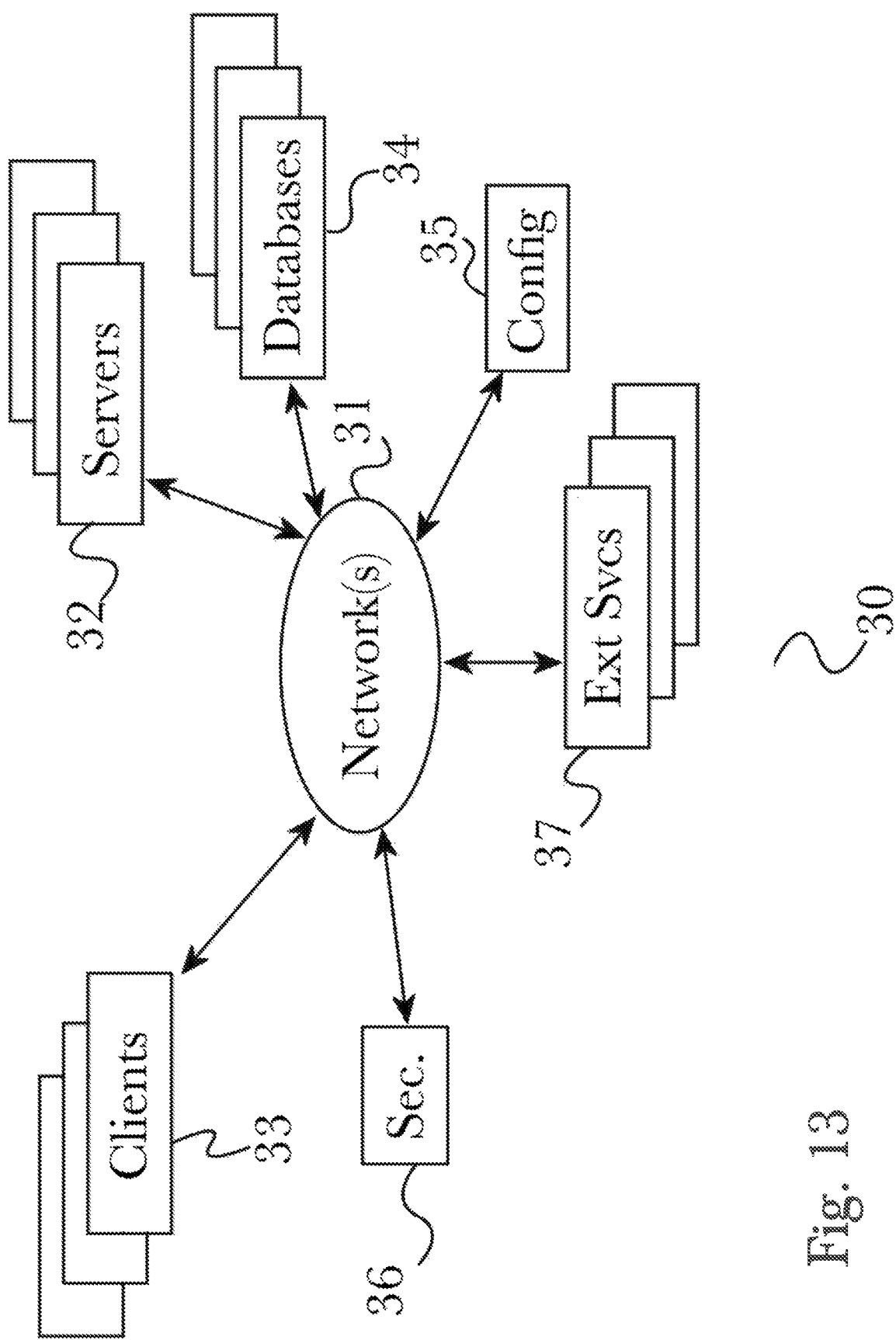
FIG. 13 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
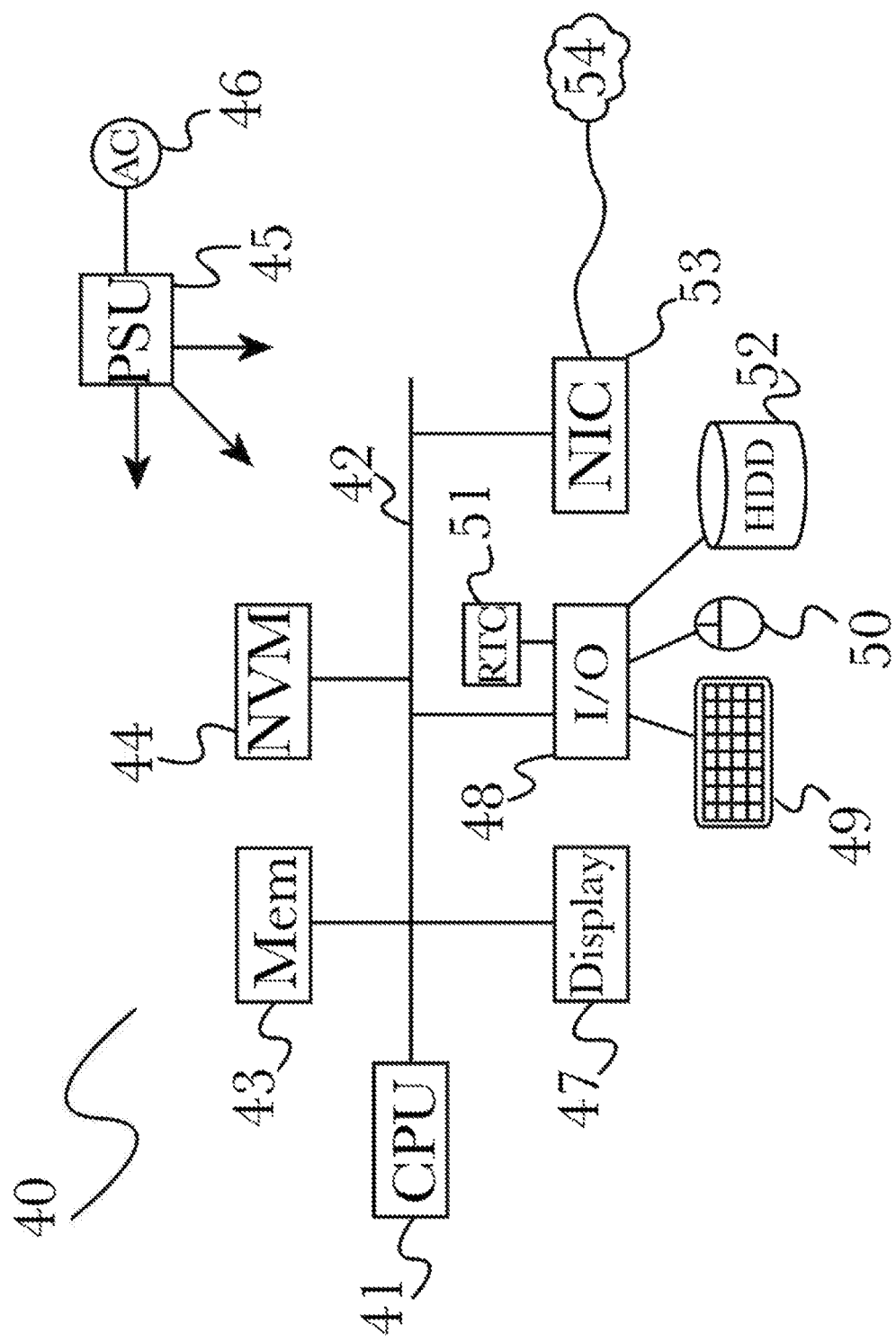
FIG. 14 is another block diagram illustrating an exemplary hardware architecture of a computing device used in various embodiments of the invention.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated regulatory compliance monitoring of messaging services, comprising:
   a compliance computer comprising a memory, at least one processor, and a plurality of programming instructions stored in the memory, the plurality of programming instructions when executed by the processor, cause the processor to:
   receive at least one compliance rule from an administrative user device;
   receive, from a monitored user device, a plurality of credentials, the credentials used to access a plurality of data from at least one messaging service account associated to the monitored user device;
   generate an asymmetric encryption key for the monitored user device to ensure security of the plurality of data;
   retrieve a list of user profiles associated with the monitored user device, each user profile of the list corresponding to at least one conversation with the monitored user device;
   receive from the monitored device at least one user profile, of the list of user profiles, to monitor for compliance;
   periodically retrieve a plurality of conversation data from the at least one messaging service to monitor for compliance, the plurality of conversation data associated to the at least one user profile;
   analyze the plurality of conversation data with the at least one compliance rule to determine if the message contains non-compliant content;
   determine a severity of the non-compliance based on a pre-determined level of severity, the level defined by the administrative user device; and
   notify the administrative user device if non-compliant content is discovered that is of a severity at or above the pre-determined level.

2. The system of claim 1, wherein if there is non-compliant content, the plurality of programming instructions when executed by the processor, further cause the processor to send a notification to the monitored user device of the non-compliant content to take corrective action.

3. The system of claim 1, wherein the analysis of the plurality of conversations is selected from the group consisting of image analysis, natural language analysis, metadata analysis, and speech analysis based on automatic speech recognition.

4. The system of claim 1, wherein a record of compliance associated to the monitored user device is stored.

5. The system of claim 1, wherein the plurality of programming instructions when executed by the processor, further cause the processor to continuously monitor the at least one messaging service account for suspicious activity, the suspicious activity associated to identify theft and cyber-attacks.

6. The system of claim 1, wherein the plurality of programming instructions when executed by the processor, further cause the processor to send compliance training and testing to a plurality of user devices.

7. The system of claim 4, wherein the plurality of programming instructions when executed by the processor, further cause the processor to send compliance training and testing to the monitored user device based on the record of compliance.

8. The system of claim 1, wherein non-compliant content is determined from processing the plurality of conversation data in context.

9. The system of claim 8, wherein the context is a geotag associated to at least one conversation data of the plurality of conversation data.

10. The system of claim 6, wherein the plurality of programming instructions when executed by the processor, further cause the processor to determine non-compliant content from one or more samples received from one or more user devices of the plurality of user devices.

11. A method for automated regulatory compliance monitoring of at least one messaging service, comprising the steps of:
    receiving at least one compliance rule from an administrative user device;
    receiving, from a monitored user device, a plurality of credentials, the credentials used to access a plurality of data from at least one messaging service account associated to the monitored user device;
    generating an asymmetric encryption key for the monitored user device to ensure security of the plurality of data;

retrieving a list of user profiles associated to the monitored user device, each user profile of the list corresponding to a conversation with the monitored user device;

receiving from the monitored device at least one user profile, of the list of user profiles, to monitor for compliance;

periodically retrieving a plurality of conversation data from the at least one messaging service to monitor for compliance, the plurality of conversation data associated to the at least one user profile;

analyzing the plurality of conversation data with the at least one compliance rule to determine if the message contains non-compliant content;

determining a severity of the non-compliance based on a pre-determined level of severity, the level defined by the administrative user device; and notifying the administrative user device if non-compliant content is discovered that is of a severity at or above the pre-determined level.

12. The method of claim 11, further comprising the step of sending a notification to the monitored user device of the non-compliant content to take corrective action.

13. The method of claim 11, wherein an analysis of the plurality of conversations is selected from the group consisting of image analysis, natural language analysis, metadata analysis, and speech analysis based on automatic speech recognition.

14. The method of claim 11, further comprising the step of storing a record of compliance associated to the monitored user device.

15. The method of claim 11, further comprising the step of continuously monitoring the at least one messaging service account for suspicious activity, the suspicious activity associated to identify theft and cyberattacks.

16. The method of claim 11, further comprising the step of sending compliance training and testing to a plurality of user devices.

17. The method of claim 14, further comprising the step of sending compliance training and testing to the monitored user device based on the record of compliance.

18. The method of claim 11, further comprising the step of determining non-compliant content by processing the plurality of conversation data in context.

19. The method of claim 18, wherein the context is a geotag associated to at least one conversation data of the plurality of conversation data.

20. The method of claim 16, further comprising the step of determining non-compliant content from one or more samples received from one or more user devices of the plurality of user devices.

* * * * *